United States Patent
Li et al.

(10) Patent No.: US 9,431,032 B1
(45) Date of Patent: Aug. 30, 2016

(54) ELECTRICAL CONNECTION ARRANGEMENT FOR A MULTIPLE SENSOR ARRAY USABLE IN TWO-DIMENSIONAL MAGNETIC RECORDING

(71) Applicant: Western Digital (Fremont), LLC, Fremont, CA (US)

(72) Inventors: Shaoping Li, San Ramon, CA (US); Steven C. Rudy, San Jose, CA (US); Ge Yi, San Ramon, CA (US); Gerardo A. Bertero, Redwood City, CA (US); Qunwen Leng, Palo Alto, CA (US); Ming Mao, Dublin, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 14/046,771

(22) Filed: Oct. 4, 2013

Related U.S. Application Data

(60) Provisional application No. 61/865,675, filed on Aug. 14, 2013.

(51) Int. Cl.
| | | |
|---|---|---|
| G11B 15/10 | (2006.01) | |
| G11B 5/115 | (2006.01) | |
| G11B 5/11 | (2006.01) | |

(52) U.S. Cl.
CPC ............... *G11B 5/115* (2013.01); *G11B 5/112* (2013.01)

(58) Field of Classification Search
CPC ..... G11B 5/115; G11B 5/4886; G11B 5/397; G11B 5/29
USPC ...................................................... 360/234.5
See application file for complete search history.

(56) References Cited

U.S. PATENT DOCUMENTS

| | | |
|---|---|---|
| 4,012,781 A | 3/1977 | Lin |
| 5,229,901 A | 7/1993 | Mallary |
| 5,270,892 A | 12/1993 | Naberhuis |
| 5,309,305 A | 5/1994 | Nepela et al. |
| 5,388,014 A | 2/1995 | Brug et al. |
| 5,684,658 A | 11/1997 | Shi et al. |
| 5,696,654 A | 12/1997 | Gill et al. |
| 5,721,008 A | 2/1998 | Huang et al. |
| 5,796,535 A | 8/1998 | Tuttle et al. |
| 5,831,888 A | 11/1998 | Glover |
| 5,963,400 A | 10/1999 | Cates et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |

(Continued)

OTHER PUBLICATIONS

Shaoping Li, et al., U.S. Appl. No. 13/928,799, filed Jun. 27, 2013, 27 pp.

*Primary Examiner* — Gustavo Polo
(74) *Attorney, Agent, or Firm* — Convergent Law Group LLP

(57) ABSTRACT

A method and system provide a magnetic transducer including first and second read sensors, a shield and a conductive via. The shield is between the first and second read sensors. The magnetic transducer also includes first and second read shields. The shield has a top surface and a bottom surface opposite to the top surface. The bottom surface faces the first read sensor. The conductive via is isolated from the first read shield and the second read shield. The conductive via provides electrical contact to the shield and is electrically connected to the bottom surface of the shield.

27 Claims, 12 Drawing Sheets

(56) References Cited

U.S. PATENT DOCUMENTS

| | | |
|---|---|---|
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,071,007 A | 6/2000 | Schaenzer et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,104,562 A | 8/2000 | Ottesen et al. |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,154,335 A | 11/2000 | Smith et al. |
| 6,157,510 A | 12/2000 | Schreck et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,191,925 B1 | 2/2001 | Watson |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,216,242 B1 | 4/2001 | Schaenzer |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,271,998 B1 | 8/2001 | Coehoorn et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,311,551 B1 | 11/2001 | Boutaghou |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,362,528 B2 | 3/2002 | Anand |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,449,131 B2 | 9/2002 | Guo et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,333 B1 | 12/2002 | Han et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |

(56) References Cited

U.S. PATENT DOCUMENTS

| | | |
|---|---|---|
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,674,618 B2 | 1/2004 | Engel et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,842,312 B1 | 1/2005 | Alstrin et al. |
| 6,859,343 B1 | 2/2005 | Alfoqaha et al. |
| 6,859,997 B1 | 3/2005 | Tong et al. |
| 6,861,756 B2 | 3/2005 | Saito et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,253 B1 | 5/2005 | Rogers et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,106,549 B2 | 9/2006 | Asakura |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,807 B1 | 3/2007 | Liikanen et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,259,927 B2 | 8/2007 | Harris |
| 7,271,970 B1 | 9/2007 | Tsuchiya |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |

(56) References Cited

U.S. PATENT DOCUMENTS

| | | |
|---|---|---|
| 7,307,814 B1 | 12/2007 | Seagle et al. |
| 7,307,818 B1 | 12/2007 | Park et al. |
| 7,310,204 B1 | 12/2007 | Stoev et al. |
| 7,315,072 B2 | 1/2008 | Watanabe |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,168 B2 | 5/2008 | Wu et al. |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,405,907 B2 | 7/2008 | Raastad |
| 7,408,730 B2 | 8/2008 | Yamagishi |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,632 B2 | 10/2008 | Li et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,868,362 B2 | 1/2011 | Randazzo et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,139,301 B1 | 3/2012 | Li et al. |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,228 B2 | 6/2012 | Maat et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |

(56) References Cited

U.S. PATENT DOCUMENTS

| | | |
|---|---|---|
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,384,220 B2 | 2/2013 | Saito et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,891,207 B1 | 11/2014 | Li et al. |
| 2010/0290157 A1 | 11/2010 | Zhang et al. |

(56) References Cited

U.S. PATENT DOCUMENTS

| | | |
|---|---|---|
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

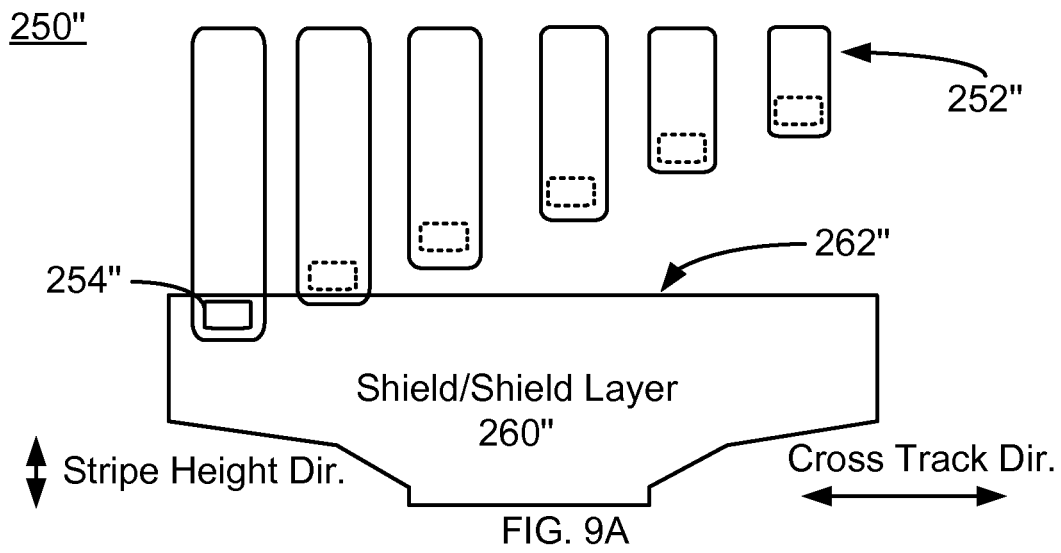
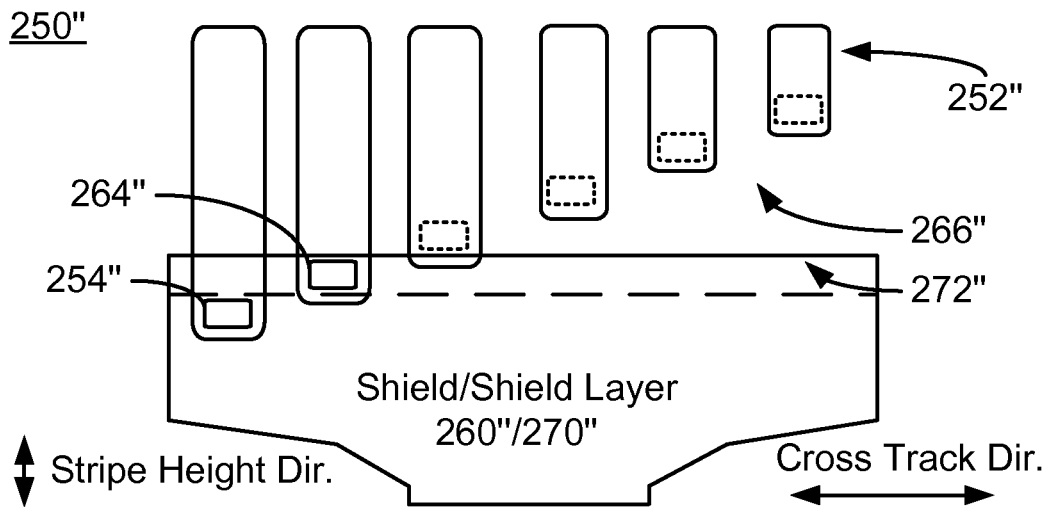
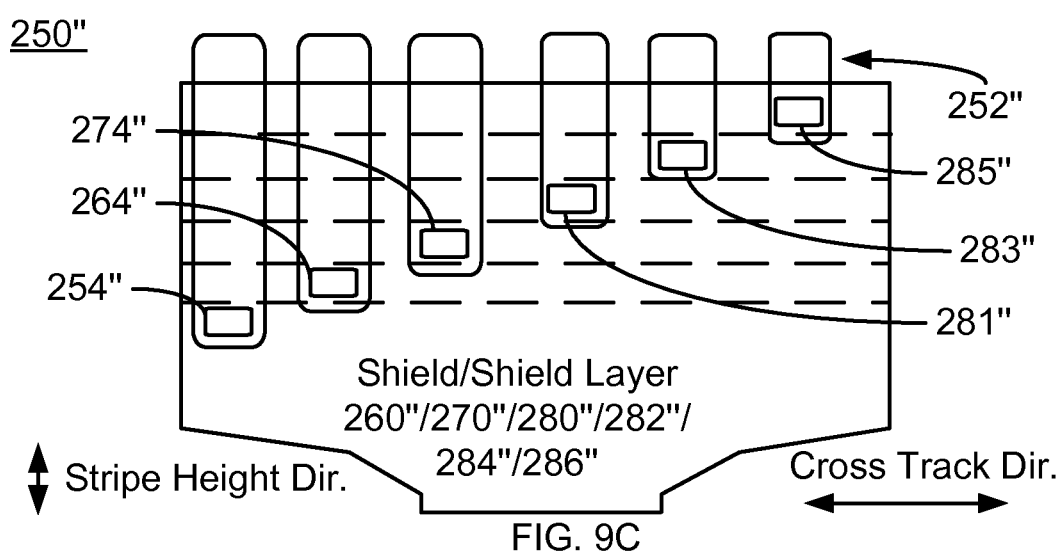

ELECTRICAL CONNECTION ARRANGEMENT FOR A MULTIPLE SENSOR ARRAY USABLE IN TWO-DIMENSIONAL MAGNETIC RECORDING

CROSS-REFERENCE TO RELATED APPLICATIONS

This application claims priority to provisional U.S. Patent Application Ser. No. 61/865,675, filed on Aug. 14, 2013, which is hereby incorporated by reference in its entirety.

BACKGROUND

FIG. 1 depicts an air-bearing surface (ABS) view of a conventional read transducer 10. The conventional read transducer 10 includes shields 12 and 20, sensor 14 and magnetic bias structures 16. The read sensor 14 is typically a giant magnetoresistive (GMR) sensor or tunneling magnetoresistive (TMR) sensor. The read sensor 14 includes an antiferromagnetic (AFM) layer, a pinned layer, a nonmagnetic spacer layer, and a free layer. Also shown is a capping layer. In addition, seed layer(s) may be used. The free layer has a magnetization sensitive to an external magnetic field. Thus, the free layer functions as a sensor layer for the magnetoresistive sensor 14. The magnetic bias structures 16 may be hard bias structures or soft bias structures. These magnetic bias structures are used to magnetically bias the sensor layer of the sensor 14.

Although the conventional magnetic recording transducer 10 functions, there are drawbacks. In particular, the conventional magnetic recording transducer 10 may not function adequately at higher recording densities. Two-dimensional magnetic recording (TDMR) technology may enable significantly higher recording densities. In TDMR, multiple read sensors are used. These sensors are longitudinally distributed along the cross track direction but are aligned in the down track direction. The sensors are separated by a particular distance in the cross track direction. In addition, the sensors have the same length (and read track width) in the cross track direction. This length is typically not more than fifty percent of the track width. The central sensor reads the data from a track of interest, while the outer sensors sense the data in adjacent tracks in order to account for noise.

Although TDMR might be capable of higher recording densities, issues may be faced at skew. For example, in some recording applications, such as shingled recording, the skew angle changes. As a result, the transducer may not perform as desired for all skew angles. In addition, providing electrical connection to the sensors may be challenging. Accordingly, what is needed is a system and method for improving the performance of a magnetic recording read transducer, particular for TDMR.

BRIEF DESCRIPTION OF SEVERAL VIEWS OF THE DRAWINGS

FIGS. 9A-9C depict plan views of another exemplary embodiment of a portion of a magnetic recording read transducer.

DETAILED DESCRIPTION OF THE EXEMPLARY EMBODIMENTS

Figure 1:
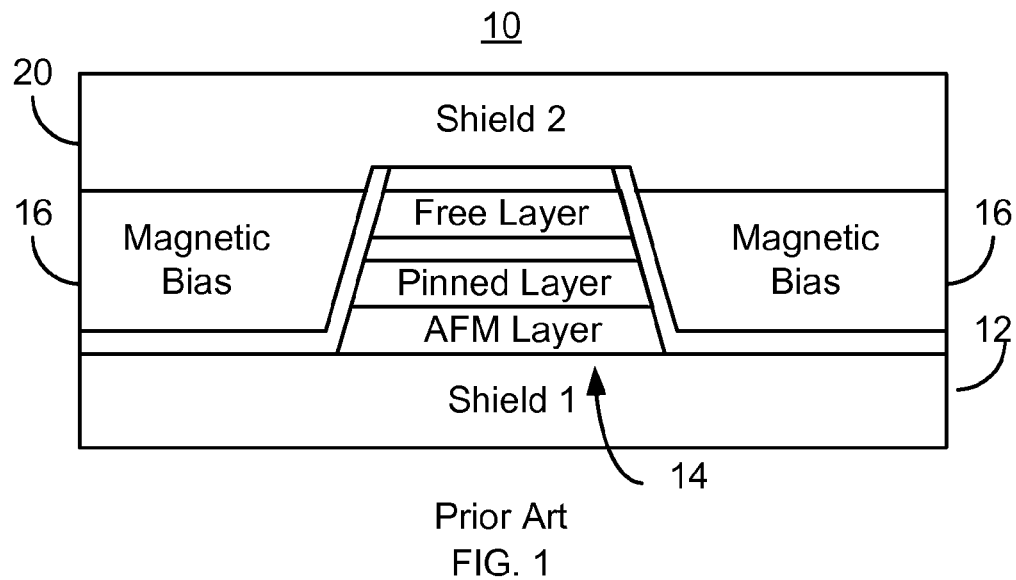
FIG. 1 depicts a conventional read transducer.
Figure 2:
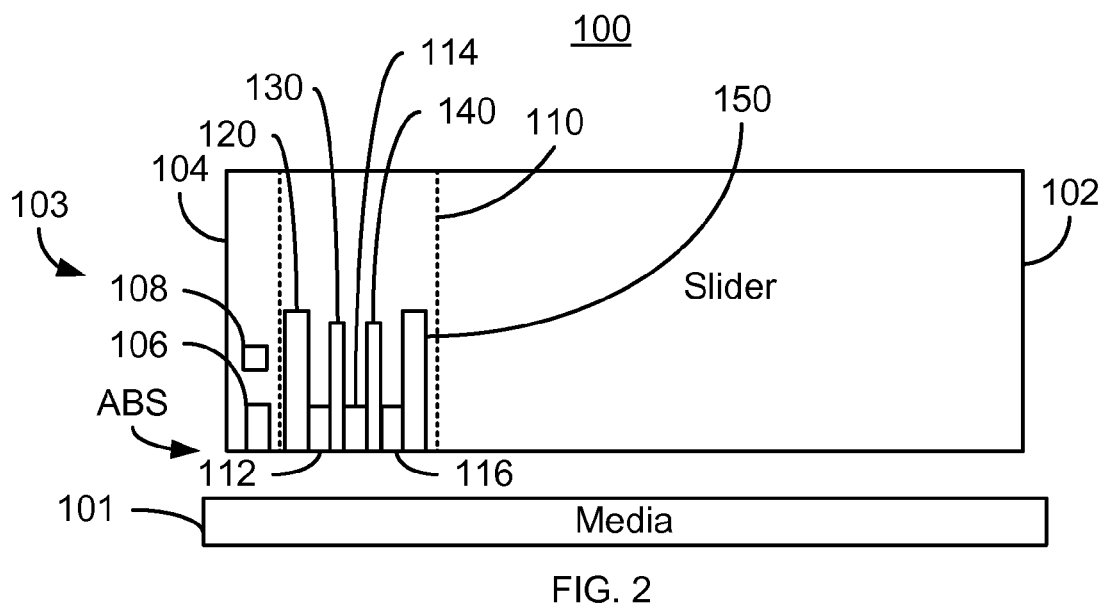
FIG. 2 depicts an exemplary embodiment of a disk drive.

FIG. 2 depicts a side view of an exemplary embodiment of a disk drive 100. For clarity, FIG. 2 is not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components are shown. However, multiples of one or more of the components and/or their sub-components might be used.

The disk drive 100 includes media 101, a slider 102, a head 103 including a write transducer 104 and a read transducer 110. The write transducer includes at least a write pole 106 and coil(s) 108 for energizing the pole 106. Additional and/or different components may be included in the disk drive 100. Although not shown, the slider 102, and thus the transducers 104 and 110 are generally attached to a suspension (not shown). The transducers 104 and 110 are fabricated on the slider 102 and include an ABS proximate to the media 101 during use. Although both a write transducer 104 and a read transducer 110 are shown, in other embodiments, only a read transducer 110 may be present.

The read transducer 110 includes multiple read sensors 112, 114 and 116. The read sensors 112, 114 and 116 include sensor layers that may be free layers in a magnetoresistive junction such as a giant magnetoresistive (GMR) sensor, a tunneling magnetoresistive (TMR) sensor. Thus, each sensor 112, 114 and 116 may include a pinning layer, a pinned layer, a nonmagnetic spacer layer and a free layer. Other layer(s) may also be present. For example, the sensors 112, 114 and 116 may also include seed layer(s) (not shown) and capping layer(s) (not shown). Although described as a GMR or TMR sensor, in other embodiments, other structures and other sensing mechanisms may be used for the sensor.

The read sensors are separated by shields 130 and 140. The read sensors 112, 114 and 116 and shields 130 and 140 are surrounded by read shields 120 and 150. Thus, as used herein, a shield may be considered to be an internal shield, which is interleaved with read sensors and between the outer, read shields. The outermost shields for the read transducer 110 are termed read shields. In the embodiment shown in FIG. 2, three read sensors 112, 114 and 116 and two internal shields 130 and 140 are shown. However, in another embodiment, another number of read sensors 112, 114 and 116 and internal shields 130 and 140 may be present. The shields/read shields 120, 130, 140 and 150 generally include soft magnetic material. In some embodiments, one or more of the shields 120, 130, 140 and 150 may include ferromagnetic layers that are antiferromagnetically coupled.

Current is driven perpendicular-to-plane for the sensors 112, 114 and 116. Thus, current is driven through the sensor 112 between the shields 120 and 130. Similarly, current is driven through the sensor 114 between the shields 130 and 140. Current is also driven through the sensor 116 between the shields 140 and 150. Thus, electrical connection is to be made to the shields 120, 130, 140 and 150. Such contacts are described below. The read transducer 110 may be used in higher density recording, such as TDMR.

Figure 3A:
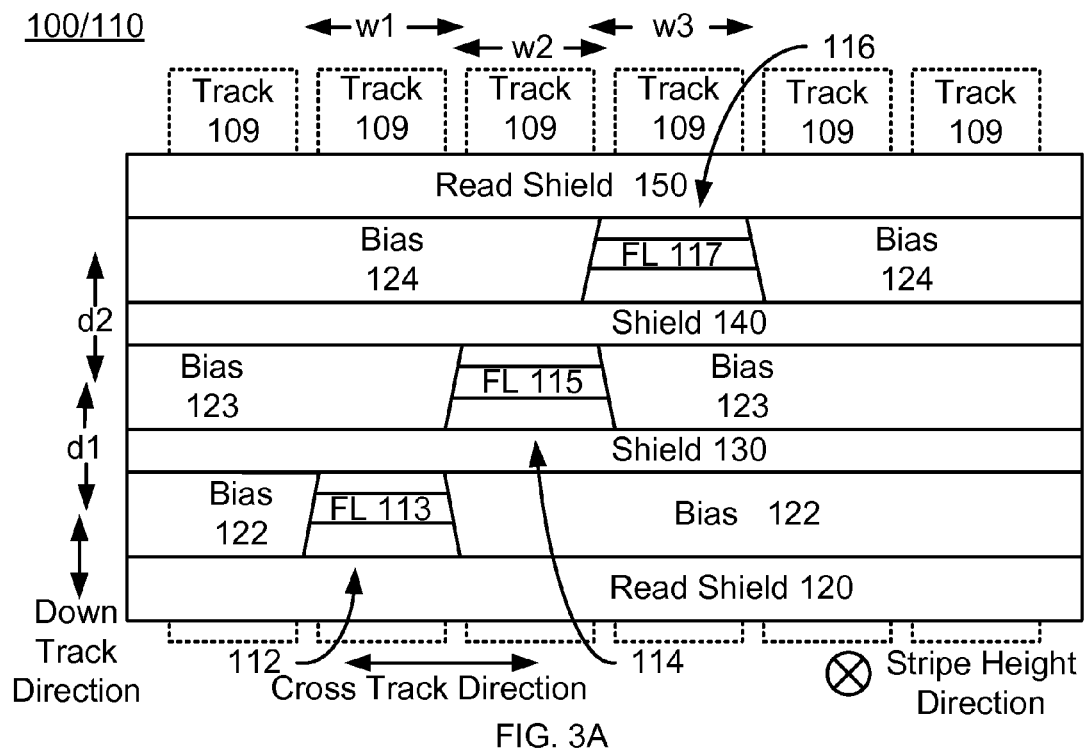
FIGS. 3A and 3B depict ABS and side views of an exemplary embodiment of a portion of a magnetic recording read transducer.
Figure 3B:
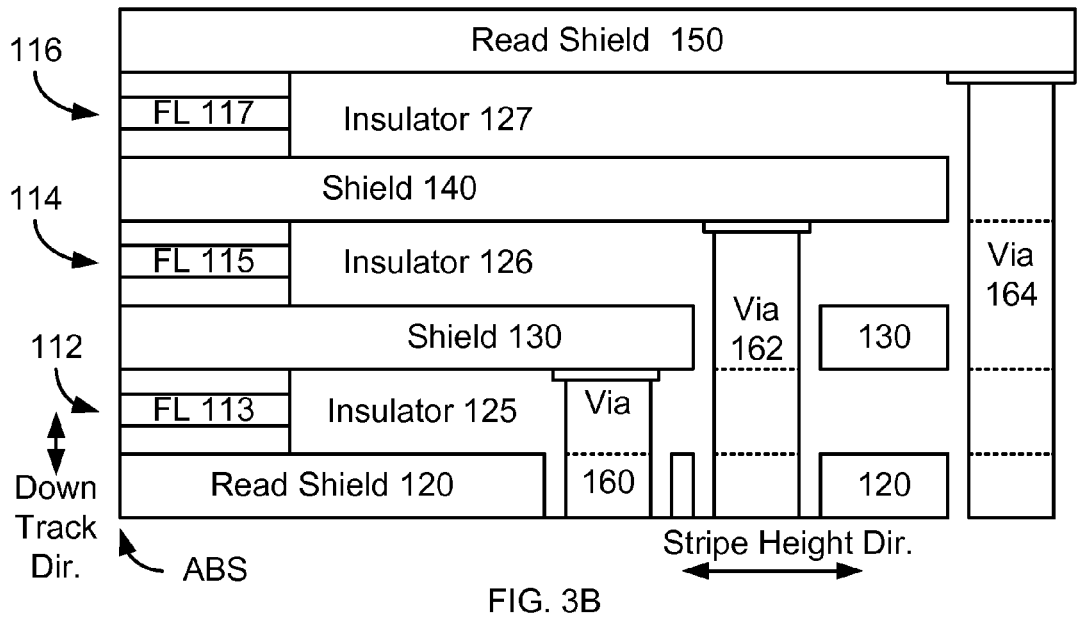

FIGS. 3A and 3B depict ABS and side views, respectively, of an exemplary embodiment of the disk drive 100 depicted in FIG. 2. For clarity, FIGS. 3A-3B are not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components are shown. However, multiples of one or more of the components and/or their sub-components might be used.

In the embodiment shown in FIGS. 3A-3B, the read transducer 110 on the slider 102 and tracks 109 of the media 101 are shown. The read transducer 110 includes multiple read sensors 112, 114 and 116. The read sensors 112, 114 and 116 include sensor layers 113, 115 and 117, respectively, that may be free layers in a magnetoresistive junction such as a GMR sensor or a TMR sensor. Thus, each sensor 112, 114 and 116 may include a pinning layer, a pinned layer, a nonmagnetic spacer layer and a free layer 113, 115, and 117, respectively. For simplicity, only the free layers 113, 115 and 117 are separately labeled in FIGS. 3A-3B. The sensors 112, 114 and 116 may also include seed layer(s) (not shown) and capping layer(s) (not shown). The pinning layer is generally an AFM layer that is magnetically coupled to the pinned layer. In other embodiments, however, the pinning layer may be omitted or may use a different pinning mechanism. The free layers 113, 115 and 117 are each shown as a single layer, but may include multiple layers including but not limited to a synthetic antiferromagnetic (SAF) structure. The pinned layer may also be a simple layer or a multilayer. Although shown as extending the same distance from the ABS, the pinned layer may extend further than the corresponding free layer 113, 115, and/or 117, respectively. The nonmagnetic spacer layer may be a conductive layer, a tunneling barrier layer, or other analogous layer. Although depicted as a GMR or TMR sensor, in other embodiments, other structures and other sensing mechanisms may be used for the sensor.

The read sensors 112, 114 and 116 are separated by distances d1 and d2 in a down track direction. The down track direction is perpendicular to the cross track direction. The cross track direction and track width direction are the same. In the embodiment shown in FIGS. 3A-3B, the distance d1 and d2 between the sensors 112 and 114 and between the sensors 114 and 116, respectively, are the same. However, in other embodiments, the distances between the sensors 112, 114 and 116 may not be the same. It is generally desirable to reduce the distance between the sensors 112, 114 and 116 in order to reduce the skew effect. The distances d1 and d2 may each be at least ten nanometers and not more than four hundred nanometers. The read sensors 112, 114 and 116 have multiple widths, w1, w2 and w3, respectively, in the track width direction. In the embodiment shown, the sensors 112 and 116 have the same width. However, in other embodiments, other widths are possible. The widths of the sensors 112, 114 and 116 may also be based on the track pitch. The track pitch is the distance from the center of one track to the center of the next track. The width, w2, is at least fifty and not more than one hundred twenty percent of the track pitch. In some such embodiments, the width of the sensor 114 is at least eighty percent and not more than one hundred percent of the track pitch. In some embodiments, the widths w1 and w3 are at least equal to the track pitch and not more than twice the track pitch. In some such embodiments, the widths w1 and w3 are each at least one hundred twenty percent and not more than one hundred fifty percent of the track pitch. However, the widths w1 and w3 may be less than or equal to the track pitch. Further, the widths may depend not only on the track pitch, but also on the distance between the sensors 112, 114 and 116.

The read sensors 112, 114 and 116 may also be displaced along the cross track direction. Therefore, the centers of each of the read sensors 112, 114 and 116 are not aligned along a vertical line that runs the down track direction. The read sensors 112, 114 and 116 may also overlap in the track width/cross track direction. The amount of overlap may depend upon the distances d1 and d2 between the sensors 112, 114 and 116. In some embodiments, the overlap may be different. For example, the sensors 112, 114 and 116 may not overlap, but instead be spaced apart. In other embodiments, the sensors 112, 114 and 116 may be aligned such that they overlap substantially completely. In the embodiment shown, the sensor 114 in the center in the down track direction is also in the center of the remaining sensors 112 and 116 in the track width direction. However, other configurations are possible.

Also shown are bias structures 122, 123 and 124 that magnetically bias the read sensors 112, 114 and 116, respectively. The magnetic bias structure(s) 122, 123 and/or 124 may be soft bias structures fabricated with soft magnetic material(s). In other embodiments, the magnetic bias structure(s) 122, 123 and/or 124 may be hard magnetic bias structures. Other mechanisms for biasing the sensors 112, 114 and 116 might also be used.

The read sensors are separated by shields 130 and 140 as well as insulators 125, 126 and 127. In the embodiment shown, therefore, the sensor 112 may be electrically connected to the sensor 114 through the shield 130. Similarly, the sensor 114 may be electrically connected to the sensor 116 through the shield 140. In some embodiments, one or more of the shields 120, 130, 140 and 150 may include ferromagnetic layers that are antiferromagnetically coupled. Further, the shields 120, 130, 140 and 150 have top surfaces and bottom surfaces opposite to the top surfaces. These surfaces are perpendicular to the down track direction. The bottom surface of each shield 120, 130, 140 and 150 is closer to the substrate (not shown) than the top surface. Thus, the bottom surface of the shield 130 faces the read shield 120 and is connected to the read sensor 112, while the top surface of the shield 130 faces the shield 140. Similarly, the bottom surface of the shield 140 faces the shield 130 and is connected to the read sensor 114, while the top surface of the shield 140 faces the read shield 150.

Electrical connection is to be made to the shields 120, 130, 140 and 150 using the conductive vias 160, 162 and 164. In some embodiments, the vias 160, 162 and 164 may be formed of high conductivity materials such as Cu and/or Ag. Although not shown, a conductive via may be used to provide electrical connection to the read shield 120. The conductive vias 160, 162 and 164 provide electrical connection to the bottoms of the shields 130, 140 and 150, respectively. Thus, the conductive via(s) 160, 162 and 164 are between the shields 130, 140 and 150, respectively, and the substrate/remaining portion of the slider 102. The conductive vias 160, 162 and 164 are shown as distributed in the stripe height direction. The conductive vias 160, 162 and 164 may be distributed both in the cross track direction and the stripe height direction. In still other embodiments, the conductive vias may be distributed in the cross track direction instead of the stripe height direction. In the embodiment shown, the conductive via 160 passes through an aperture or notch in the read shield 120. In other embodiments, the conductive via may be isolated from the read shield 120 in a different manner. For example, the read shield 120 may terminate closer to the ABS than the location of the conductive via 160. Stated differently, the back edge (edge opposite to the ABS) of the read shield 120 may be closer to the ABS than the conductive via 160. Thus, the conductive via 160 is not only physically and electrically connected to the shield 130 but also electrically isolated from the read shield 120. Similarly, the conductive via 162 passes through an aperture or notch in the read shield 120 and an aperture or notch in the shield 130. In other embodiments, the conductive via 163 may be isolated from the read shield 120 and/or shield 130 in a different manner. For example, the read shield 120 and/or shield 130 may have a back edge that is closer to the ABS than the conductive via 162. Thus, the conductive via 162 is not only physically and electrically connected to the shield 140 but also electrically isolated from the read shield 120 and the shield 130. Note, however, that the conductive vias 160 and 162 are electrically connected to the read shield 120 and shield 130 through the sensors 112 and 114. Similarly, the conductive via 164 is physically and electrically connected to the read shield 150. However, the conductive via is electrically isolated from the remaining shields 120, 130 and 140. In some embodiments, this may be accomplished by passing the conductive via 164 through aperture(s) and/or notch(es) in the shields 120, 130 and 140. However, in other embodiments, the back edges of the shields 120, 130 and/or 140 terminated closer to the ABS than the conductive via 164. In other embodiments, with fewer shields and/or fewer read sensors, another number of conductive vias may be used. For example, if the sensor 112 and shield 130 were omitted, then the via 160 may be omitted. In some embodiments, a preamplifier may be coupled between the read shield 150 and the shield 140. Another preamplifier may be coupled between the shields 130 and 140. A third preamplifier may be coupled between the shield 130 and the read shield 120. Thus, signals may be read from the sensors 112, 114 and 116.

In some embodiments, the conductive vias 160, 162 and/or 164 are stacked vias that are formed layer by layer with the remainder of the transducer 110. For example, the lowest layer in the vias 160 162 and 164 may be formed substantially at the same time as the read shield 120 is formed. Via holes may be formed in the read shield 120, then an insulator and a part of each of the conductive vias 160, 162 and/or 164 formed in the via holes. After deposition of the insulator 125, via holes are formed and filled with a conductive material. Thus, the next level of the conductive vias 160, 164 and 166 is completed. Similar processes may be carried out for each subsequent layer including but not limited to the shields 130 and 140. For such an embodiment, the layers formed are indicated by dotted lines in the conductive vias 160, 162 and 164. In some embodiments, pads (not shown) may also be formed at these locations. However, these pads do not electrically connect the conductive vias to the shield/shield layers. In other embodiments, the conductive via(s) 160, 162 and 164 may be formed as a single monolithic structure. For example, a via hole may be formed in the read shield and insulating layer 125 at or near the same time as the shield 130 is formed. The via hole is then filled to form the conductive via 160. Later, a via hole is formed in the insulators 125 and 126, shield 130 and read shield 120. The conductive via 162 is then formed in the via hole. Thus, each conductive via 160, 162 and 164 is a monolithic structure. Also shown in FIG. 3B are conductive pads used to connect the conductive vias 160, 162 and 164 with the corresponding shield 130, 140 and 150. However, in other embodiments, the pads may be omitted. Finally, connecting the conductive via 160, 162 and 164 with the corresponding shield 130, 140 and 150, respectively, may be completed in a different manner. For example, apertures corresponding to the vias 160, 162 and 164 may be formed in the shields 130, 140 and 150. These apertures may then be refilled with a conductive material to make electrical contact with the underlying conductive via 160, 162 and/or 164. The material used for the refill may be magnetic or, in alternate embodiments, nonmagnetic.

The read transducer 110 may be used in higher density recording, such as TDMR. Through the placement of the sensors 112, 114 and 116, the transducer 110 may address skew issues that might otherwise adversely affect performance of the transducer 110. In applications such as TDMR, the sensors 112 and 116 may be better able gather data for cancellation of noise from the tracks 109 adjacent to the track 109 being read. Thus, reading of very high density tracks may be accomplished. Further, the transducer 110 may be scalable. In addition, the conductive vias 160 and 162 may provide electrical contact to the shields 140 and 130 with a relatively modest contact resistance.

Figure 4A:
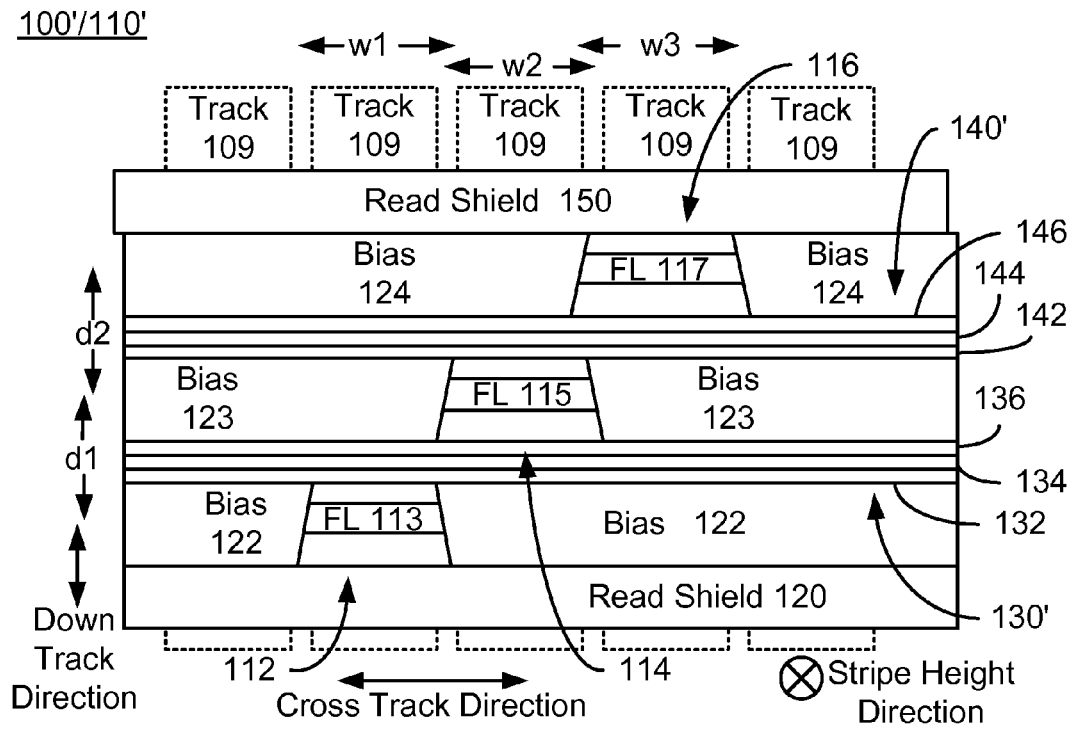
FIGS. 4A and 4B depict ABS and side views of another exemplary embodiment of a portion of a magnetic recording read transducer.
Figure 4B:
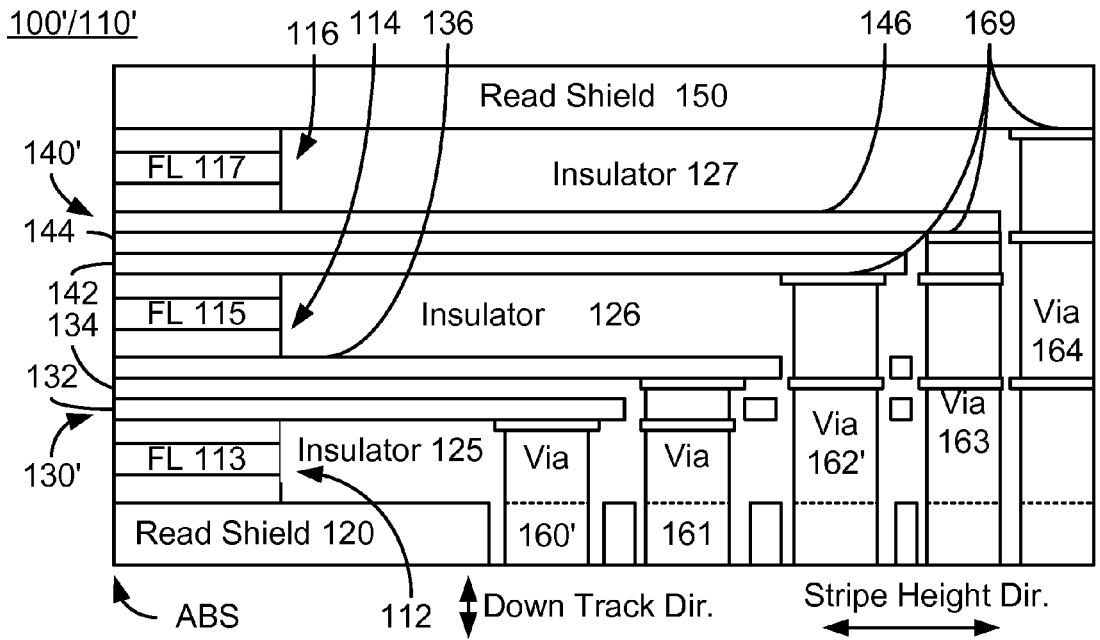

FIGS. 4A and 4B depict ABS and side views, respectively, of an exemplary embodiment of the disk drive 100' analogous to the disk drive 100 depicted in FIGS. 2-3B. Similar components have analogous labels. For clarity, FIGS. 4A-4B are not to scale. For simplicity not all portions of the disk drive 100' are shown. In addition, although the disk drive 100' is depicted in the context of particular components other and/or different components may be used. For example, circuitry used to drive and control various portions of the disk drive 100 is not shown. For simplicity, only single components are shown. However, multiples of one or more of the components and/or their sub-components might be used.

The disk drive 100' is analogous to the disk drive 100. Thus, FIGS. 4A-4B depict a read transducer 110' on the slider 102 and tracks 109 of the media 101 are shown that are analogous to the read transducer 110 and tracks 109. The read transducer 110' includes multiple read sensors 112, 114 and 116, read shields 120 and 150 and bias structures 122, 123 and 124 that are analogous to the sensors 112, 114 and 116, read shields 120 and 150 and bias structures 122, 123 and 124, respectively. The sensor layers 113, 115 and 117 are analogous to the sensors layers 113, 115 and 117, respectively, depicted in FIBS. 3A-3B.

Referring back to FIGS. 4A-4B, the shields 130' and 140' are analogous to the shields 130 and 140. However, the shields 130' and 140' are multilayers. In particular, the shield 130' includes shield layers 132 and 136 separated by insulating layer 134. The shield layers 132 and 136 are magnetic and conductive. In some embodiments, one or more of the shield layers 132 and 136 includes antiferromagnetically coupled sublayers. Similarly, the shield 140' includes shield layers 142 and 146 separated by insulting layer 144. The shield layers 142 and 146 are magnetic and conductive. In some embodiments, one or more of the shield layers 142 and 146 includes antiferromagnetically coupled sublayers. Further, the shield layers 132, 136, 142 and 146 have top surfaces and bottom surfaces opposite to the top surfaces. These surfaces are perpendicular to the down track direction. The bottom surface of each shield layer 132, 136, 142 and 150 is closer to the substrate (not shown) than the top surface. Thus, the bottom surface of the shield layer 132 faces the read shield 120 and is connected to the read sensor 112. The top surface of the shield layer 136 faces the shield 140 and is electrically connected to the read sensor 114. Similarly, the bottom surface of the shield layer 142 faces the shield 130 and is connected to the read sensor 114. The top surface of the shield layer 146 faces the read shield 150 and is electrically connected to the sensor 116.

Because of the configuration of the shields 130' and 140', the sensors 112, 114 and 116 may be electrically isolated. In particular, the sensor 112 is coupled with read shield 120 and the bottom shield layer 132 of the shield 130'. The read sensor 114 is electrically coupled with the top shield layer 136 of the shield 130' and the bottom shield layer 142 of the shield 140'. Finally, the read sensor 116 is electrically connected with the top shield layer 146 of the shield 140' and the bottom of the read shield 150. However, because of the presence of the insulating layers 134 and 144, the read sensors 112, 114 and 116 may not be electrically connected through the shields 130 and 140.

Current is driven through the sensor 112 between the shields 120 and 130'. Similarly, current is driven through the sensor 114 between the shields 130' and 140'. Current is also driven through the sensor 116 between the shields 140' and 150. Thus, electrical connection is to be made to the shields 120, 130', 140' and 150. The conductive vias 160', 161, 162', 163 and 164 shown are used to provide electrical contact to the shields 130', 140' and 150. In some embodiments, the conductive vias 160', 161, 162', 163 and 164 may be formed of high conductivity materials such as Cu and/or Ag. The conductive vias 160', 161, 162', 163 and 164 are shown as distributed in the stripe height direction. The conductive vias 160', 161, 162', 163 and 164 may be distributed in both the cross-track direction and the stripe height direction. In still other embodiments, the conductive vias 160', 161, 162', 163 and 164 may be distributed in the cross track direction instead of the stripe height direction. Although not shown, a conductive via may be used to provide electrical connection to the read shield 120.

The conductive vias 160', 162' and 164 provide electrical connection to the bottoms of the shield layer 132, the shield layer 142 and read shield 150, respectively. In the embodiment shown, the conductive via 160' passes through an aperture or notch in the read shield 120. In other embodiments, the conductive via may be isolated from the read shield 120 in a different manner. For example, the back edge of the read shield 120 may be closer to the ABS than the conductive via 160'. Thus, the conductive via 160' is not only physically and electrically connected to the shield layer 132 but also electrically isolated from the read shield 120. The conductive via 161 passes through an aperture or notch in the read shield 120 as well as an aperture or notch in the shield layer 132. The conductive via 161 thus contacts with the bottom of shield layer 136. Similarly, the conductive via 162' passes through an aperture or notch in the read shield 120 and an aperture or notch in the layers 132, 134 and 136 of the shield 130'. In other embodiments, the conductive via 162' may be isolated from the read shield 120 and/or shield 130' in a different manner. For example, the read shield 120 and/or shield layers 132 and 136 may have a back edge that is closer to the ABS than the conductive via 162'. The conductive via 162' electrically contacts the bottom of the shield layer 142 of the shield 140'. Thus, the conductive via 162' is not only physically and electrically connected to the shield layer 142 but also electrically isolated from the read shield 120 and the shield 130'. Similarly, the conductive via 163 electrically contacts the bottom of the shield layer 146 of the shield 140'. Thus, the conductive via 163 is not only physically and electrically connected to the shield layer 146 of the shield 140' but also electrically isolated from the read shield 120 and the shield 130'. The conductive via 164 is physically and electrically connected to the read shield 150. However, the conductive via is electrically isolated from the remaining shields 120, 130' and 140' in an analogous manner to that described above.

In some embodiments, the conductive vias 160', 161, 162', 163 and/or 164 are stacked vias that are formed layer by layer with the remainder of the transducer 110. In the embodiment shown, pads that are used to connect the vias to their corresponding shield/shield layers are also shown. In other embodiments, such pads may be omitted. For such an embodiment, the layers formed are indicated by dashed lines in the conductive vias 160', 161, 162', 163 and 164 that do not contact a shield/shield layer. In other embodiments, the conductive via(s) 160', 161, 162', 163 and/or 164 may be formed as a single monolithic structure. Also shown in FIG. 4B are conductive pads used to connect the conductive vias 160', 161, 162', 163 and 164 with the corresponding shield 130', 140' and 150. However, in other embodiments, the pads may be omitted. Although depicted as simply contacting the bottom of the shield, in other embodiments, the conductive vias 160', 161, 162' and 163 may be formed by providing an aperture in the corresponding shield layer(s) 132, 136, 142 and 146, respectively, then filling the aperture with conductive material(s). These material(s) may be magnetic or nonmagnetic.

The read transducer 110' may be used in higher density recording, such as TDMR. Through the placement of the sensors 112, 114 and 116, the transducer 110' may address skew issues that might otherwise adversely affect performance of the transducer 110'. In applications such as TDMR, the sensors 112 and 116 may be better able gather data for cancellation of noise from the tracks 109 adjacent to the track being read. Thus, reading of very high density tracks may be accomplished. Further, the transducer 110' may be scalable. In addition, the conductive vias 160', 161, 162' and 163 may provide electrical contact to the shields 140' and 130' with a relatively modest contact resistance.

Figure 5:
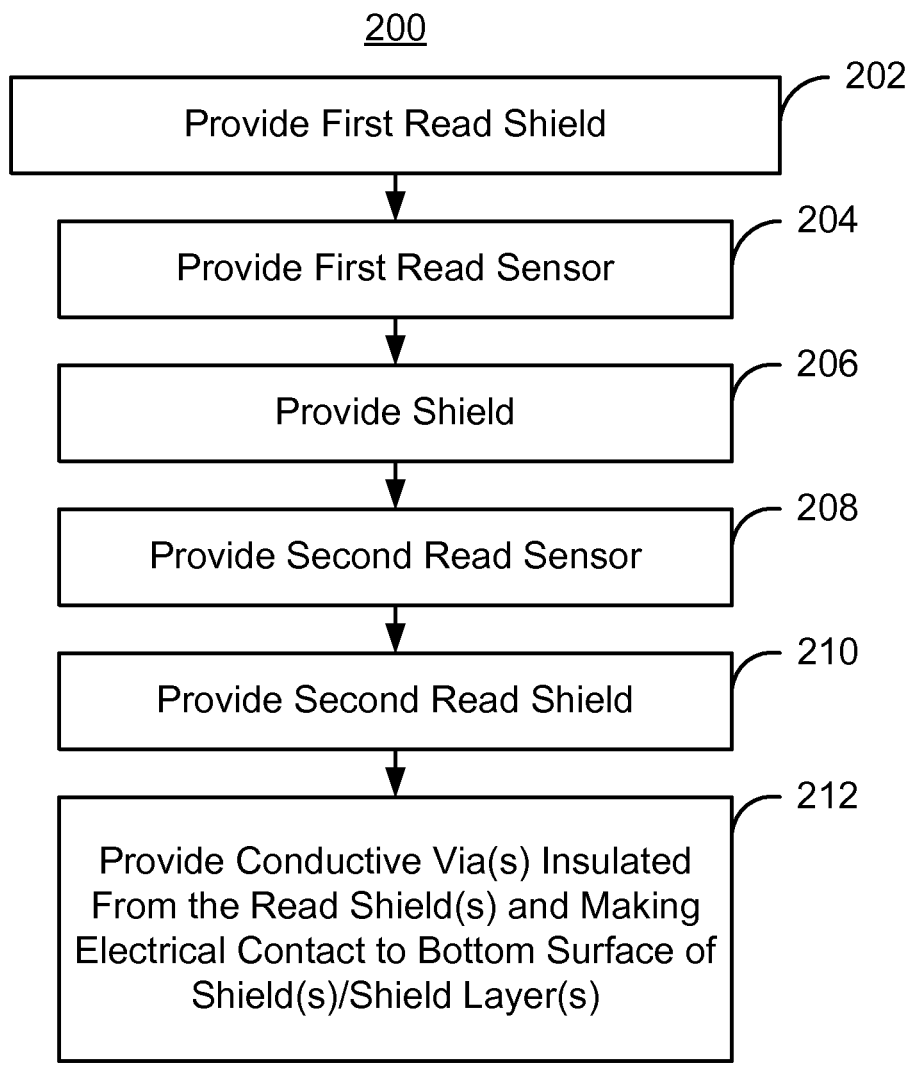
FIG. 5 is a flow chart depicting an exemplary embodiment of a method for fabricating a magnetic recording read transducer.

FIG. 5 is an exemplary embodiment of a method 200 for providing a read transducer including multiple read sensors. For simplicity, some steps may be omitted, interleaved, and/or combined. The method 200 is also described in the context of providing a single recording transducer 110/110' in the disk drives 100 and 100' depicted in FIGS. 2-4B. However, the method 200 may be used to fabricate multiple transducers at substantially the same time. The method 200 may also be used to fabricate other transducers including but not limited to any combination of those disclosed herein. The method 200 is also described in the context of particular layers. A particular layer may include multiple materials and/or multiple sub-layers. The method 200 also may start after formation of other portions of the magnetic recording transducer.

The first read shield 120 is provided, via step 202. Step 202 typically includes depositing a large high permeability layer. The read sensor 112 is provided, via step 204. Step 204 includes depositing the layers for the sensor 112 and defining the sensor 112 in at least the track width direction using an ion mill. In some embodiments, the free layer 113 and the pinned layer of the sensor 112 is also defined in the stripe height direction. The magnetic bias structures for the sensor 112 may also be provided as part of step 204.

The shield 130/130' is provided, via step 206. In some embodiments, step 206 includes depositing a soft magnetic material, such as NiFe. Step 206 may also include depositing and patterning the layers 132, 134 and 136 of the shield 130'. The read sensor 114 is provided, via step 208. Step 208 includes depositing the layers for the sensor 114 and defining the sensor 114 in at least the track width direction using an ion mill. In some embodiments, the free layer 115 and the pinned layer of the sensor 114 is also defined in the stripe height direction. The magnetic bias structures for the sensor 114 may also be provided.

If sensor 116 is to be used, then the shield 140/140' and sensor 116 may be provided in a manner analogous to steps 204 and 206. If, however, two sensors 112 and 114 are to be used, then the read shield 150 is provided, via step 210. Step 210 may include forming a shield having ferromagnetic layers which are antiferromagnetically coupled. In other embodiments, other multilayers or a single layer may be formed.

Conductive vias 160, 162, 160', 161, 162', 163 and/or 164 are provided, via step 212. Step 212 includes forming conductive vias 160, 162, 160', 161, 162', 163 and/or 164 below the corresponding shield 130/130', 140/140' and 150 such that the conductive vias 160, 162, 160', 161, 162', 163 and/or 164 contact the bottom of the corresponding shield 130/130', 140/140' and 150 and/or shield layer 132, 136, 142 and 146. Thus, the benefits of the magnetic transducer(s) 110, and/or 110' may be achieved.

Figure 6:
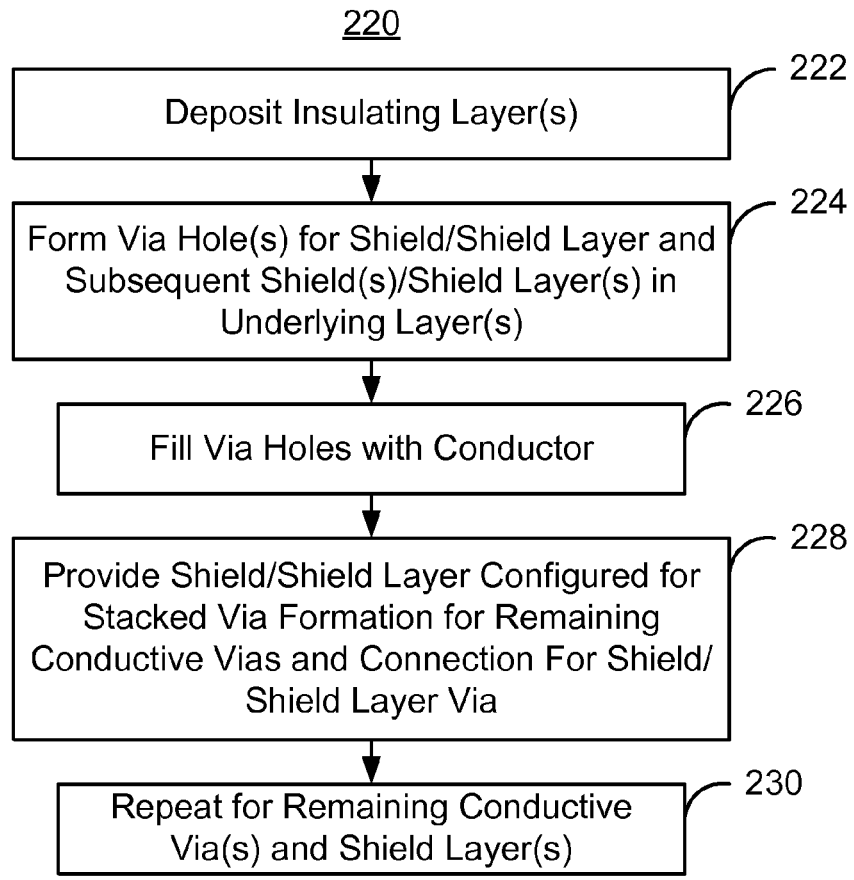
FIG. 6 is a flow chart depicting an exemplary embodiment of a method for fabricating shield(s) and connections for a magnetic recording read transducer.

FIG. 6 is an exemplary embodiment of a method 220 for providing shield(s) and stacked conductive vias in a read transducer including multiple read sensors. For simplicity, some steps may be omitted, interleaved, and/or combined. The method 220 is also described in the context of providing a single recording transducer 110/110' in the disk drives 100 and 100' depicted in FIGS. 2-4B. However, the method 220 may be used to fabricate multiple transducers at substantially the same time. The method 220 may also be used to fabricate other transducers including but not limited to any combination of those disclosed herein. The method 220 is also described in the context of particular layers. A particular layer may include multiple materials and/or multiple sub-layers. The method 220 also may start after formation of other portions of the magnetic recording transducer.

Insulating layer(s) 125 are deposited, via step 222. Step 222 is performed after any other underlying structures are formed. The via hole(s) for the conductive vias 160/160', 161, 162/162', 163 and 164 are formed, via step 224. These via holes may then be filled with a conductor, via step 226. Thus, the same layer for all of the conductive vias 160/160', 161, 162/162', 163 and 164 substantially during the same steps. In some embodiments, the layers may be planarized after formation of the layer for the conductive vias.

The corresponding shield/shield layer 130/132 is then formed, via step 228. Step 228 includes configuring the shield/shield layer 130/132 for the conductive vias remaining to be formed. For example, notches or apertures may be provided in the shield/shield layer 130/132. This may be accomplished by providing an etch mask having apertures over the desired regions and removing portions of the shield/shield layer 130/132. A portion of the notch or aperture may be partially filled with an insulator to ensure that the remaining conductive vias are insulated from the shield 130/shield layer 132. In other embodiments, the back edge of the shield/shield layer 130/132 may be configured to be between the ABS and the remaining conductive vias. Steps 222 through 228 may then be repeated for conductive vias making electrical contact to subsequent layers, via step 230.

Figure 7A:
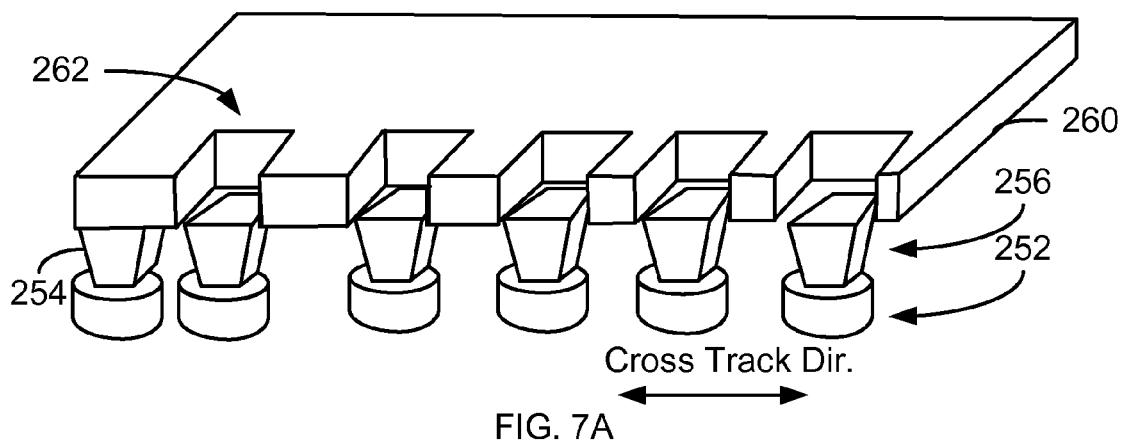
FIGS. 7A-7C depict perspective views of another exemplary embodiment of a portion of a magnetic recording read transducer.
Figure 7B:
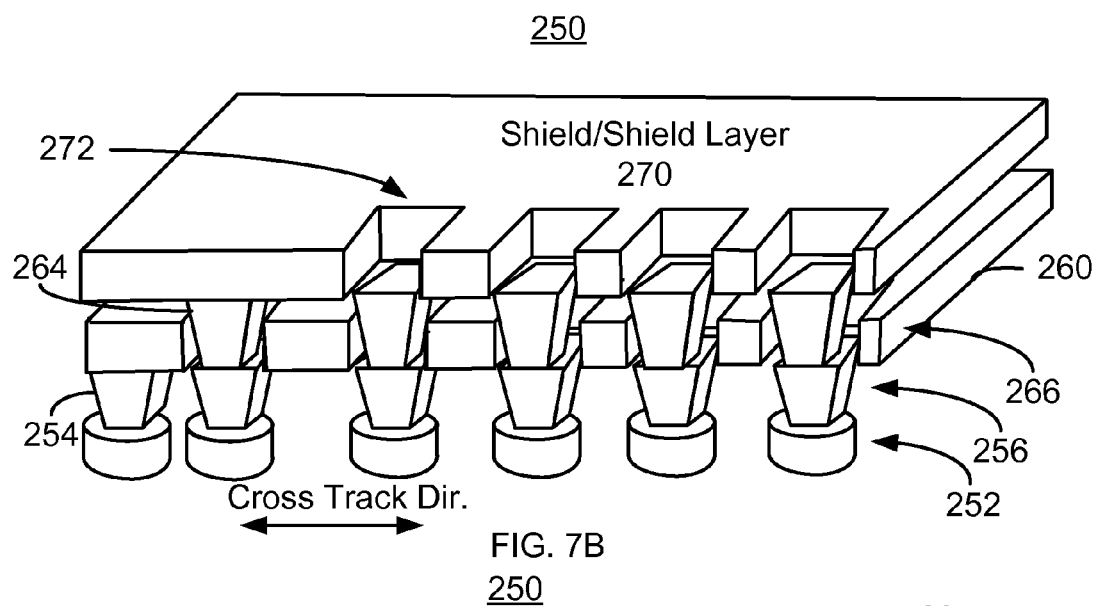
Figure 7C:
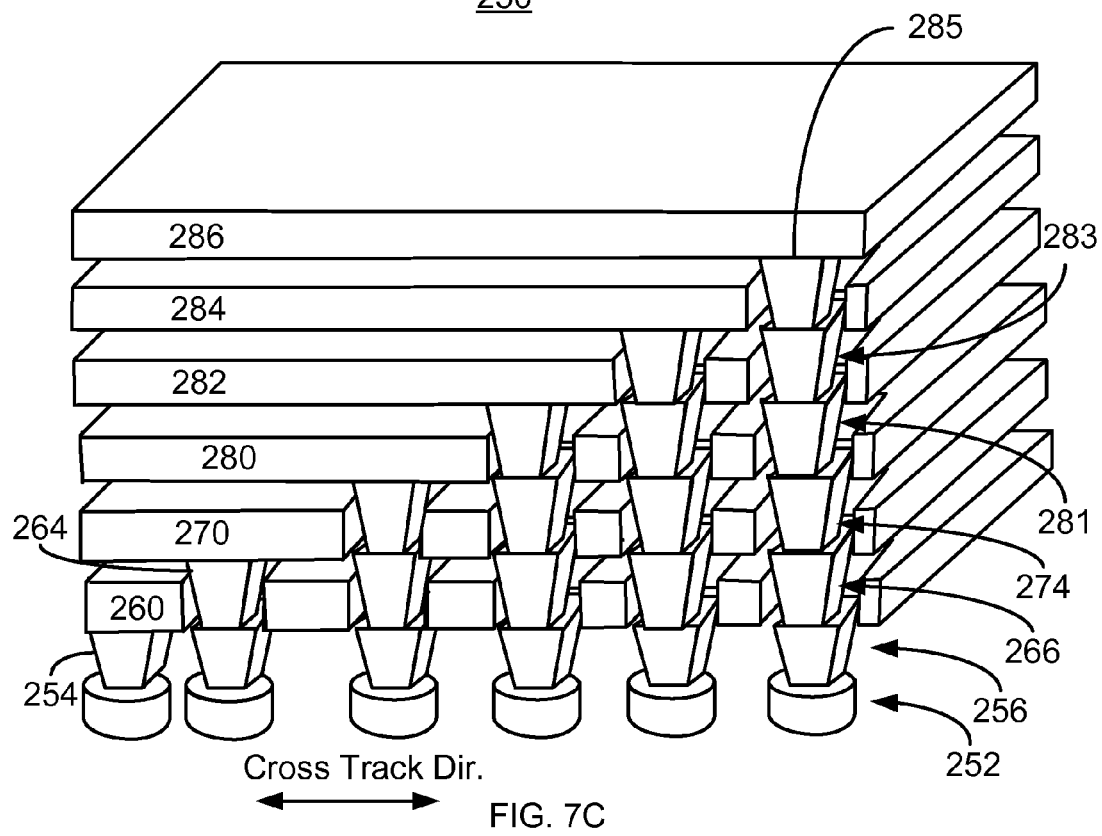

FIGS. 7A-7C depict an exemplary embodiment of a portion of a magnetic transducer 250 during fabrication using the method 220. For clarity, only shield/shield layers and conductive vias are shown. FIGS. 7A-7C are not to scale. The transducer 250 is analogous to the read transducers 110 and 110'. FIG. 7A depicts the transducer 250 after steps 222-228 have been carried out. Thus, underlying pads 252 for the conductive vias are shown. The shield/shield layer 260 is also depicted. Conductive via 254 makes contact to the bottom of the shield/shield layer 260. The bottom layer of the remaining conductive vias 256 is also shown as having been formed. These structures 254 and 256 may be formed in steps 222-226. Apertures 262 are present (of which only one is labeled) in the shield/shield layer 260 for remaining conductive vias. Note that the conductive vias being fabricated are shown as distributed along the cross track direction. However, in other embodiments, the conductive vias may be distributed along the stripe height direction or along both the stripe height and cross track directions.

FIG. 7B depicts the transducer 250 after the next shield/shield layer 270 is formed using a second iteration of steps 222-228 through step 230. Thus, the conductive via 264 making contact to shield layer 270 is shown. The next layer 266 for the remaining conductive vias is also shown. Apertures 272 above this layer 266 have also been formed in the shield 270 in step 228. As can be seen in FIG. 7B, the conductive vias 254 and 264 only make contact to the corresponding shield/shield layer 260 and 270, respectively. The layers 256 and 266 for the remaining conductive vias are isolated from the shield/shield layers 260 and 270.

FIG. 7C depicts the transducer 250 after the conductive vias have been formed using multiple iterations of steps 222-228. Thus, shield/shield layers 280, 282, 284 and 286 have also been formed. Conductive via layers 274, 281, 283 and 285 have also been formed. The layers 274, 281, 283 and 285 make electrical contact only to corresponding shield/shield layers 280, 282, 284 and 286, respectively.

Figure 8A:
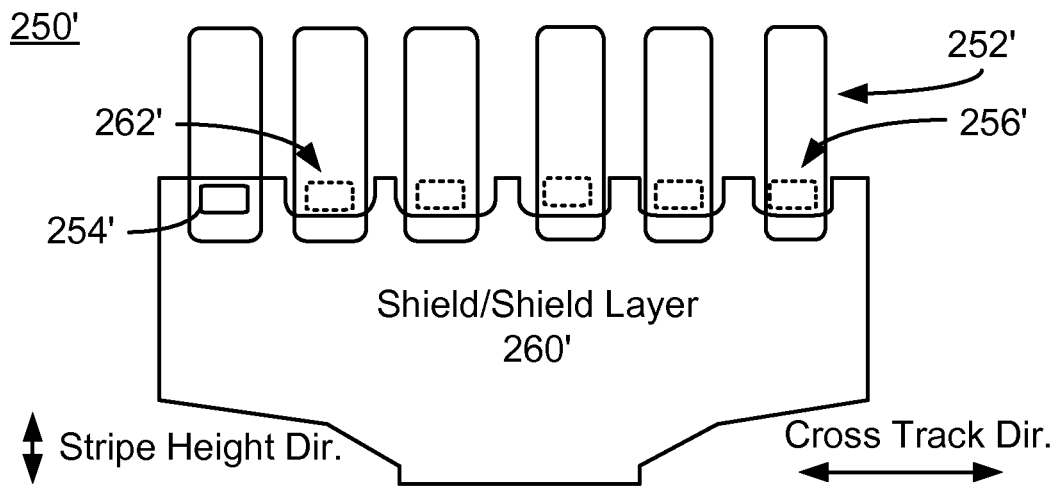
FIGS. 8A-8C depict plan views of another exemplary embodiment of a portion of a magnetic recording read transducer.
Figure 8B:
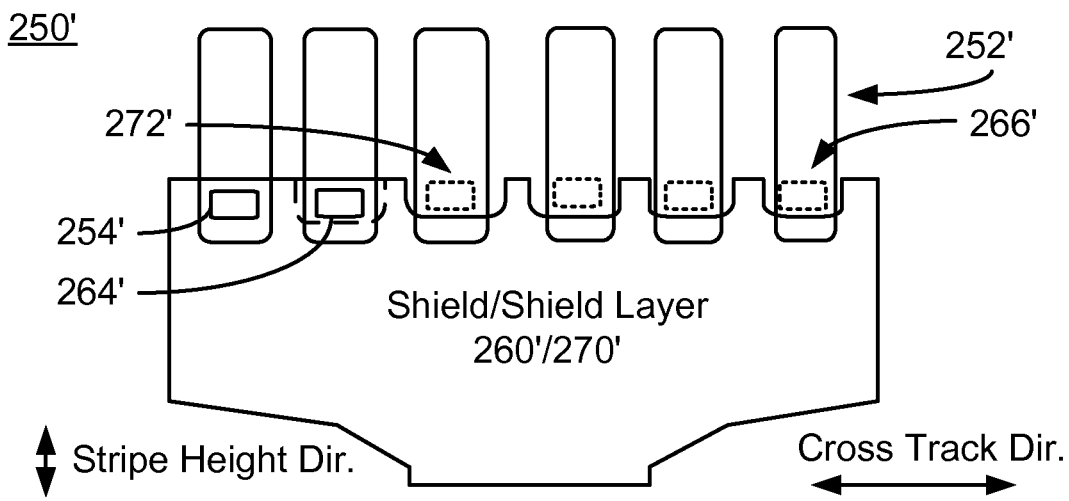
Figure 8C:
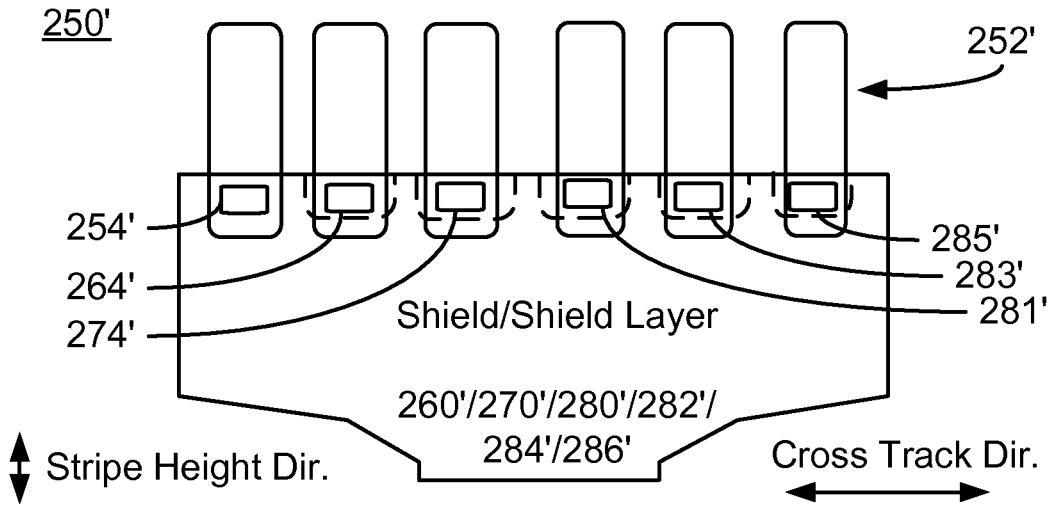

FIGS. 8A-8C depict plan views an exemplary embodiment of a portion of a magnetic transducer 250' during fabrication using the method 220. For clarity, only shield/shield layers and conductive vias are shown. FIGS. 8A-8C are not to scale. The transducer 250' is analogous to the read transducers 110 and 110'. FIG. 8A depicts the transducer 250' after steps 222-228 have been carried out. Thus, underlying pads 252' for the conductive vias are shown. Conductive via 254' makes contact to the bottom of the shield/shield layer 260'. The bottom layer of the remaining conductive vias 256' is also shown as having been formed and is depicted using dotted lines. The shield/shield layer 260' is also depicted. Notches 262' are present (of which only one is labeled) in the shield/shield layer 260' for remaining conductive vias. Note that the conductive vias being fabricated are shown as distributed along the cross track direction. However, in other embodiments, the conductive vias may be distributed along the stripe height direction or along both the stripe height and cross track directions.

FIG. 8B depicts the transducer 250' after the next shield/shield layer 270' is formed using an additional iteration of the steps 222-228. Thus, the conductive via 264' making contact to shield layer 270' is shown. The next layer 266' for the remaining conductive vias is also shown. Notches 272' in the shield/shield layer 270' above this layer 266' have also been formed. The conductive vias 254' and 264' only make contact to the corresponding shield/shield layer 260' and 270', respectively. The layers 256' and 266' for the remaining conductive vias are isolated from the shield/shield layers 260' and 270'.

FIG. 8C depicts the transducer 250' after the conductive vias have been formed by multiple iterations of steps 222-228, via step 230. Thus, shield/shield layers 280', 282', 284' and 286' have also been formed. Conductive via layers 274', 281', 283' and 285' have also been formed. The layers 274', 281', 283' and 285' make electrical contact only to corresponding shield/shield layers 280', 282', 284' and 286', respectively. The top shield layer 286' may have no notches because contact is made to the last conductive via. Notches in the underlying shield/shield layers 260', 270', 280', 282' and 284' are shown by dashed lines.

FIGS. 9A-9C depict plan views an exemplary embodiment of a portion of a magnetic transducer 250" during fabrication using the method 220. For clarity, only shield/shield layers and conductive vias are shown. FIGS. 9A-9C are not to scale. The transducer 250" is analogous to the read transducers 110 and 110'. FIG. 9A depicts the transducer 250" after steps 222-228 have been carried out. Thus, underlying pads 252" for the conductive vias are shown. Conductive via 254" makes contact to the bottom of the shield/shield layer 260". The bottom layer of the remaining conductive vias 256" is also shown as having been formed using dotted lines. The shield/shield layer 260" is also depicted. The back edge 262" of the shield layer 260" is configured to be closer to the ABS than are remaining conductive vias. Note that the conductive vias being fabricated are shown as distributed along the cross track direction and the stripe height direction.

FIG. 9B depicts the transducer 250" after the next shield/shield layer 270" is formed by another iteration of steps 222-228. Thus, the conductive via 264" making contact to shield layer 270" is shown. The next layer 266" for the remaining conductive vias is also shown. The back edge 272" in the shield/shield layer 270" is also configured to be between the remaining conductive vias and the ABS. The location of the back edge of the shield 260" is shown by a dashed line. The conductive vias 254" and 264" only make contact to the corresponding shield/shield layer 260" and 270", respectively. The layers 256" and 266" for the remaining conductive vias are isolated from the shield/shield layers 260" and 270".

FIG. 9C depicts the transducer 250" after the conductive vias have been formed by multiple iterations of steps 222-228. Thus, shield/shield layers 280", 282", 284" and 286" have also been formed. Conductive via layers 274", 281", 283" and 285" have also been formed. The back edges of each of the shield/shield layers 280", 282", 284" and 286" (shown by dashed lines for layers 280", 282" and 284'") are between subsequent conductive vias and the ABS. The layers 274", 281", 283" and 285" make electrical contact only to corresponding shield/shield layers 280", 282", 284" and 286", respectively.

Thus, using the method 220, stacked conductive vias shown in FIGS. 7A-7C, 8A-8C and/or 9A-9C may be formed. The conductive vias/stacks may make electrical contact to the desired shield/shield layer. In addition, these stacked vias may be formed layer by layer. As such, fabrication of the conductive vias and corresponding transducers may be facilitated.

Figure 10:
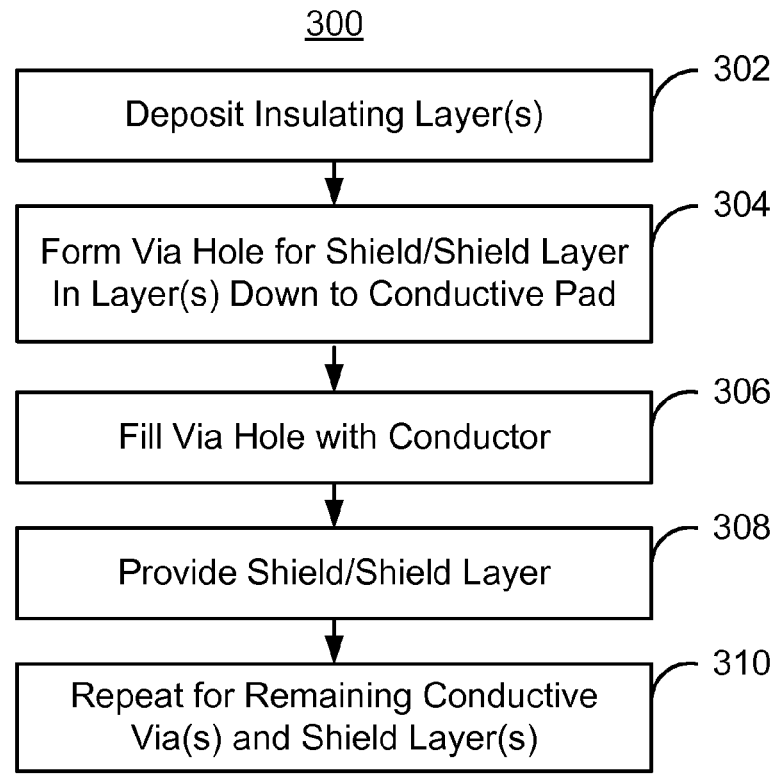
FIG. 10 is a flow chart depicting another exemplary embodiment of a method for fabricating shield(s) and connections for a magnetic recording read transducer.

FIG. 10 is an exemplary embodiment of a method 300 for providing shield(s) and monolithic conductive vias in a read transducer including multiple read sensors. For simplicity, some steps may be omitted, interleaved, and/or combined. The method 300 is also described in the context of providing a single recording transducer 110/110' in the disk drives 100 and 100' depicted in FIGS. 2-4B. However, the method 300 may be used to fabricate multiple transducers at substantially the same time. The method 300 may also be used to fabricate other transducers including but not limited to any combination of those disclosed herein. The method 300 is also described in the context of particular layers. A particular layer may include multiple materials and/or multiple sublayers. The method 300 also may start after formation of other portions of the magnetic recording transducer.

Insulating layer(s) 125 below the shield/shield layer being formed are deposited, via step 302. Other structure(s) below the shield/shield layer being formed may also be provided in step 302. A via hole for the conductive via that makes electrical contact to that shield/shield layer is formed, via step 304. Step 304 may include removing portions of multiple layers to provide the via hole that exposes the desired underlying contact. This via hole may then be filled with a conductor, via step 306. Thus, a single conductive via for the appropriate shield/shield layer is formed.

The corresponding shield/shield layer 130/132 is formed, via step 308. In some embodiments, step 308 is performed before step 304. Thus, the via hole may be provided through the shield layer, and then refilled with a conductor. However, in such an embodiment, it is ensured in step 304 that the conductive via provided in step 306 is in electrical contact with the shield/shield layer. Steps 302 through 308 may then be repeated for conductive vias making electrical contact to subsequent layers, via step 310.

Figure 11A:
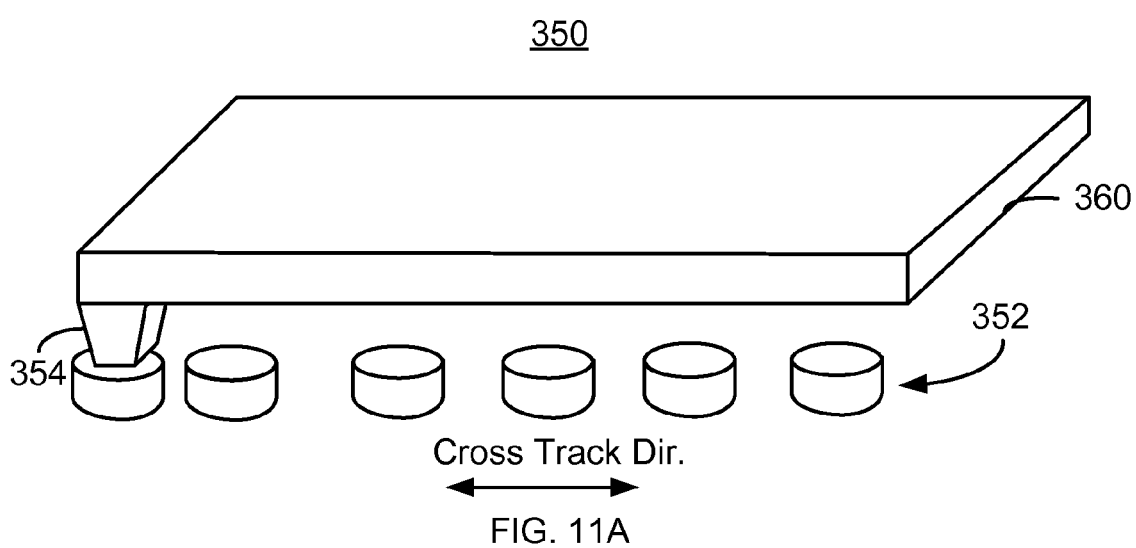
FIGS. 11A-11C depict perspective views of another exemplary embodiment of a portion of a magnetic recording read transducer.
Figure 11B:
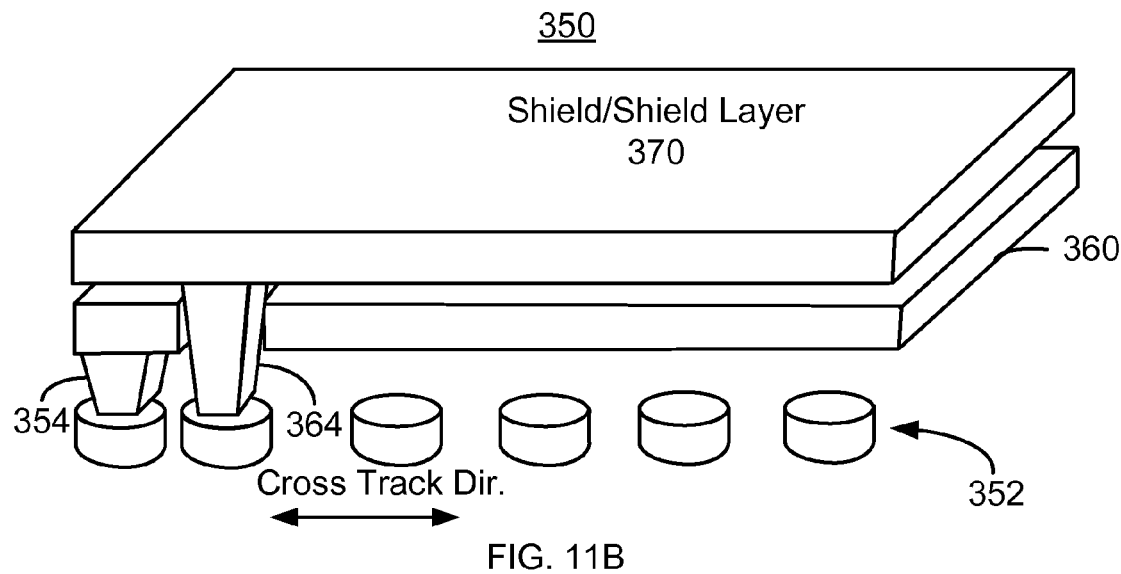
Figure 11C:
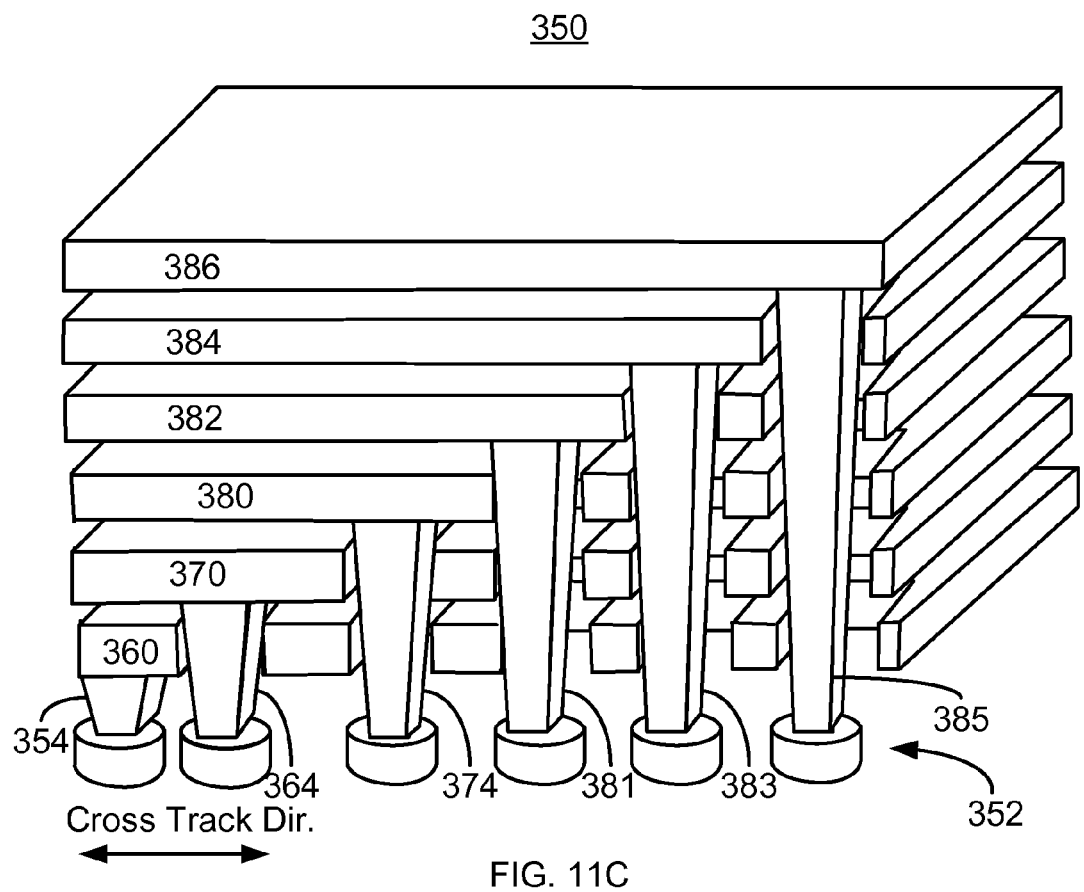

FIGS. 11A-11C depict an exemplary embodiment of a portion of a magnetic transducer 350 during fabrication using the method 300. For clarity, only shield/shield layers and conductive vias are shown. FIGS. 11A-11C are not to scale. The transducer 350 is analogous to the read transducers 110 and 110'. FIG. 11A depicts the transducer 350 after steps 302-308 have been carried out. Thus, underlying pads 352 for the conductive vias are shown. The shield/shield layer 360 is also depicted. Conductive via 354 makes contact to the bottom of the shield/shield layer 360. Note that the conductive vias being fabricated are shown as distributed along the cross track direction. However, in other embodiments, the conductive vias may be distributed along the stripe height direction or along both the stripe height and cross track directions.

FIG. 11B depicts the transducer 350 after the next shield/shield layer 370 is formed using a second iteration of steps 302-308 through step 310. Thus, the conductive via 364 making contact to shield layer 370 is shown. Note that an aperture has been formed in the shield layer 360 to accommodate this conductive via 364 and ensure that the shield layer 360 is electrically isolated from the conductive via 364. An aperture has also been formed in any other layers between the shield/shield layer 370 and the corresponding pad 352 to accommodate this conductive via 364. The conductive vias 354 and 364 only make contact to the corresponding shield/shield layer 360 and 370, respectively.

FIG. 11C depicts the transducer 350 after the conductive vias have been formed using multiple iterations of steps 302-308. Thus, shield/shield layers 380, 382, 384 and 386 have also been formed. Conductive vias 374, 381, 383 and 385 have also been formed. The conductive vias 374, 381, 383 and 385 make electrical contact only to corresponding shield/shield layers 380, 382, 384 and 386, respectively. Also note that aperture(s)s have been formed in the shield/shield layers 360, 370, 380, 382 and 384 to accommodate conductive vias for subsequent shield/shield layers 380, 382, 384 and 386.

Figure 12A:
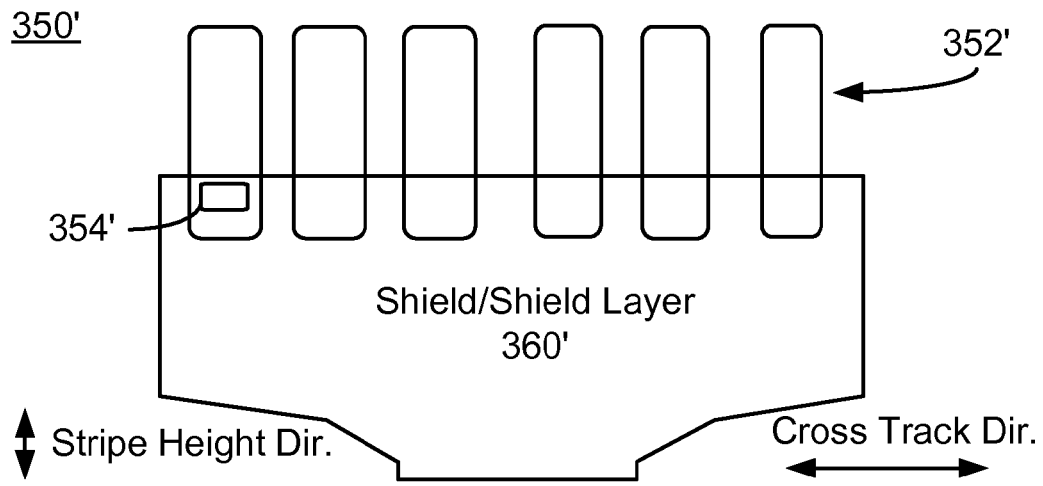
FIGS. 12A-12C depict plan views of another exemplary embodiment of a portion of a magnetic recording read transducer.
Figure 12B:
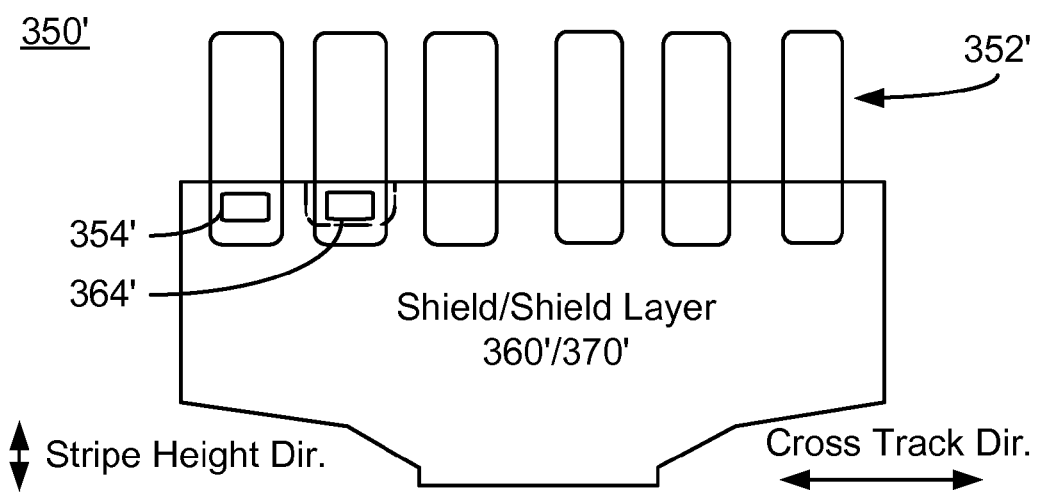
Figure 12C:
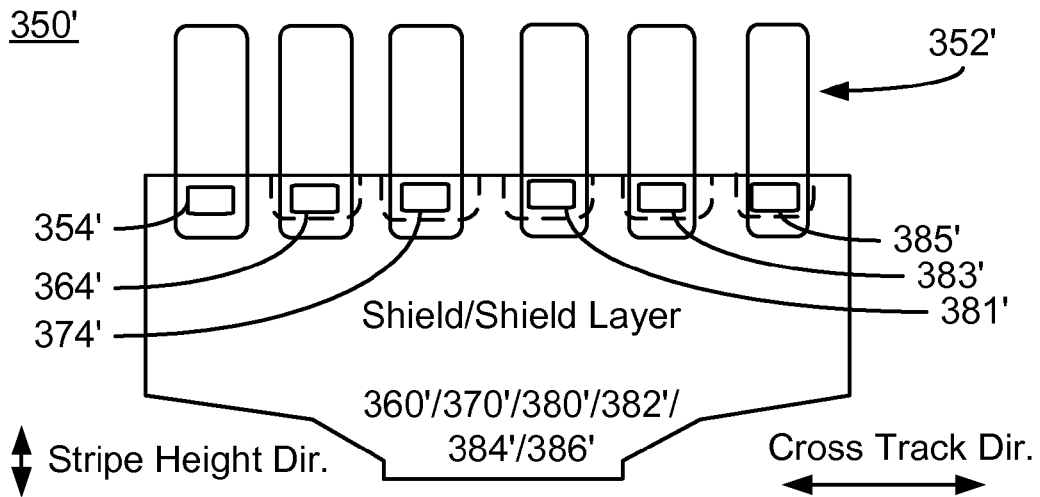

FIGS. 12A-12C depict plan views an exemplary embodiment of a portion of a magnetic transducer 350' during fabrication using the method 300. For clarity, only shield/shield layers and conductive vias are shown. FIGS. 12A-12C are not to scale. The transducer 350' is analogous to the read transducers 110 and 110'. FIG. 12A depicts the transducer 350' after steps 302-308 have been carried out. Thus, underlying pads 352' for the conductive vias are shown. The shield/shield layer 360' is also depicted. Conductive via 354' makes contact to the bottom of the shield/shield layer 360'. Note that the conductive vias being fabricated are shown as distributed along the cross track direction. However, in other embodiments, the conductive vias may be distributed along the stripe height direction or along both the stripe height and cross track directions.

FIG. 12B depicts the transducer 350' after the next shield/shield layer 370' is formed using an additional iteration of the steps 302-308. Thus, the conductive via 364' making contact to shield layer 370' is shown. A notch in the shield/shield layer 360' has also been formed during fabrication of the conductive via 364'. This notch is depicted by a dashed line. The conductive vias 354' and 364' only make contact to the corresponding shield/shield layer 360' and 370', respectively.

FIG. 12C depicts the transducer 350' after the conductive vias have been formed by multiple iterations of steps 302-308, via step 310. Thus, shield/shield layers 380', 382', 384' and 386' have also been formed. Conductive vias 374', 381', 383' and 385' have also been formed. The layers 374', 381', 383' and 385' make electrical contact only to corresponding shield/shield layers 380', 382', 384' and 386', respectively. Notches have also been formed in the underlying layers when the monolithic conductive vias 374', 381', 383' and 385' are fabricated.

Figure 13A:
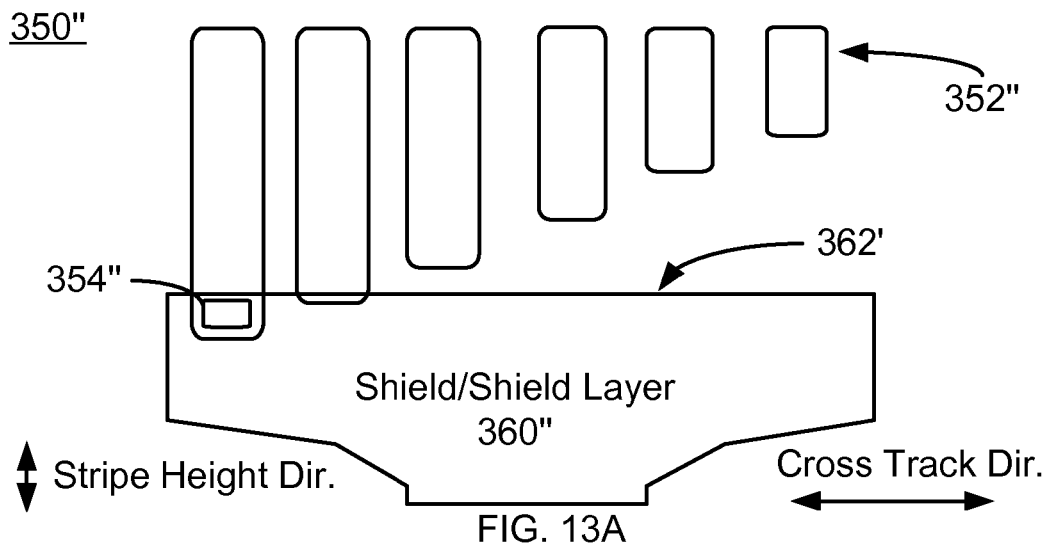
FIGS. 13A-13C depict plan views of another exemplary embodiment of a portion of a magnetic recording read transducer.
Figure 13B:
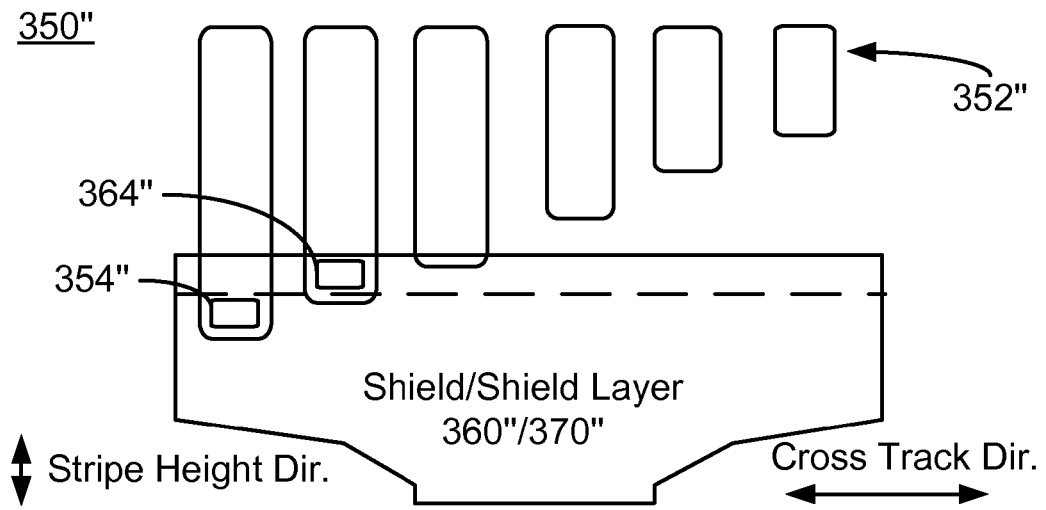
Figure 13C:
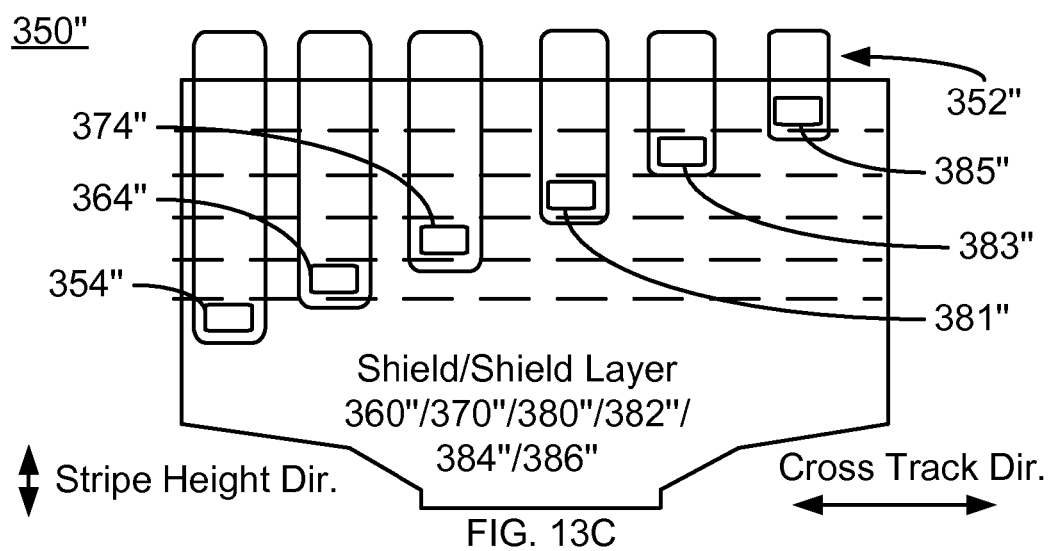

FIGS. 13A-13C depict plan views an exemplary embodiment of a portion of a magnetic transducer 350" during fabrication using the method 300. For clarity, only shield/shield layers and conductive vias are shown. FIGS. 13A-13C are not to scale. The transducer 350" is analogous to the read transducers 110 and 110'. FIG. 13A depicts the transducer 350" after steps 302-308 have been carried out. Thus, underlying pads 352" for the conductive vias are shown. The shield/shield layer 360" is also depicted. Conductive via 354" makes contact to the bottom of the shield/shield layer 360". The back edge 362" of the shield layer 360" is configured to be closer to the ABS than are remaining conductive vias to be formed. Note that the conductive vias being fabricated are shown as distributed along the cross track direction and the stripe height.

FIG. 13B depicts the transducer 350" after the next shield/shield layer 370" is formed by another iteration of steps 302-308. Thus, the conductive via 364" making contact to shield layer 370" is shown. The back edge of the shield/shield layer 370" is also configured to be between the remaining conductive vias and the ABS. The location of the back edge of the shield 360" is shown by a dashed line. The conductive vias 354" and 364" only make contact to the corresponding shield/shield layer 360" and 370", respectively.

FIG. 13C depicts the transducer 350" after the conductive vias have been formed by multiple iterations of steps 302-308. Thus, shield/shield layers 380", 382", 384" and 386" have also been formed. Conductive vias 374", 381", 383" and 385" have also been formed. The back edges of each of the shield/shield layers 380", 382", 384" and 386" (shown by dashed lines for layers 380", 382" and 384"') are between subsequent conductive vias and the ABS. The conductive vias 374", 381", 383" and 385" make electrical contact only to corresponding shield/shield layers 380", 382", 384" and 386", respectively.

Thus, using the method 300, monolithic conductive vias shown in FIGS. 11A-11C, 12A-12C and/or 13A-13C may be formed. The monolithic conductive vias may make electrical contact to the desired shield/shield layer. In addition, these monolithic conductive vias may be for the corresponding shield layer. As such, fabrication of the conductive vias and corresponding transducers may be facilitated

We claim:

1. A magnetic read transducer having an air-bearing surface (ABS) and comprising:
   a first read shield;
   a first read sensor;
   a shield having a top surface and a bottom surface opposite to the top surface, the bottom surface facing the first read sensor;
   a second read sensor, the shield residing between the first read sensor and the second read sensor;
   a second read shield, the first read sensor, the second read sensor and the shield residing between the first read shield and the second read shield; and
   a conductive via for providing electrical contact to the shield, the conductive via being insulated from the first read shield and the second read shield and contacting the bottom surface of the shield.

2. The magnetic read transducer of claim 1 further comprising:
   a third read sensor between the second read shield and the second read sensor;
   a second shield having a second shield top surface and a second shield bottom surface opposite to the second shield top surface, the second shield bottom surface facing the second read sensor, the second shield residing between the third read sensor and the second read sensor; and
   a second conductive via for providing electrical contact to the second shield, the second conductive via being insulated from the first read shield, the second read shield and the shield, the second conductive via contacting the second shield bottom surface.

3. The magnetic read transducer of claim 2 wherein the shield has a notch therein, the second conductive via passing through the notch.

4. The magnetic read transducer of claim 3 wherein the second read shield includes a second read shield bottom facing the third read sensor, the magnetic read transducer further comprising:
   a second read shield conductive via for providing electrical contact to the second read shield, the second read shield conductive via being insulated from the first read shield, the shield and the second shield, the second read shield conductive via contacting a second read shield bottom surface; and wherein the second shield has a second notch therein, the second read shield conductive via passing through the second notch.

5. The magnetic read transducer of claim 2 wherein the shield has a back surface opposite to the ABS and the second shield has a second back surface opposite to the ABS, the first back surface being closer to the ABS than the second back surface, the second conductive via residing between the first back surface and the second back surface.

6. The magnetic read transducer of claim 2 wherein the conductive via is a first distance from the ABS and the second conductive via is a second distance from the ABS, the second distance being different from the first distance.

7. The magnetic read transducer of claim 2 wherein the conductive via and the second conductive via are distributed along a cross track direction.

8. The magnetic read transducer of claim 2 further wherein the conductive via is a monolithic structure.

9. The magnetic read transducer of claim 2 wherein the conductive via is a stacked via including a plurality of conductive layers.

10. The magnetic read transducer of claim 1 wherein the shield includes a first shield layer, a second shield layer and an insulating layer between the first shield layer and the second shield layer, the first shield layer residing between the first read sensor and the second shield layer, the first shield layer including the bottom surface, the second shield layer including the top surface, the conductive via contacting the first shield layer and being insulated from the second shield layer, the second shield layer having a second bottom surface facing the first shield layer and wherein the magnetic read transducer further includes:

a second conductive via for providing electrical contact to the second shield layer, the second conductive via being insulated from the first read shield, the second read shield and the first shield layer, the second conductive via contacting the second bottom surface.

11. The magnetic read transducer of claim 10 wherein the first shield layer has notch therein, the second conductive via passing through the notch.

12. The magnetic read transducer of claim 11 wherein the second read shield includes a second read shield bottom facing the second read sensor, the magnetic read transducer further comprising:

a second read shield conductive via for providing electrical contact to the second read shield, the second read shield conductive via being insulated from the first read shield, the first shield layer and the second shield layer, the second read shield conductive via contacting a second read shield bottom surface; and wherein the second shield layer has second notch therein, the second read shield conductive via passing through the second aperture and the second notch.

13. The magnetic read transducer of claim 10 wherein the first shield layer has a first back surface opposite to the ABS and the second shield layer has a second back surface opposite to the ABS, the first back surface being closer to the ABS than the second back surface, the second conductive via residing between the first back surface and the second back surface.

14. The magnetic transducer of claim 10 wherein the conductive via is a first distance from the ABS and the second conductive via is a second distance from the ABS, the second distance being different from the first distance.

15. The magnetic read transducer of claim 10 wherein the conductive via and the second conductive via are distributed along a cross track direction.

16. The magnetic read transducer of claim 10 further wherein the conductive via is a monolithic structure.

17. The magnetic transducer of claim 10 wherein the conductive via includes a stacked via including a plurality of conductive layers.

18. A disk drive comprising:
a media;
a slider including a magnetic read transducer having an air-bearing surface (ABS), the read transducer including a first read shield, a first read sensor, a shield, a second read sensor, a second read shield, and a conductive via, the shield having a top surface and a bottom surface opposite to the top surface, the bottom surface facing the first read sensor, the shield residing between the first read sensor and the second read sensor, the first read sensor, the second read sensor and the shield residing between the first read shield and the second read shield, the conductive via for providing electrical contact to the shield, the conductive via being insulated from the first read shield and the second read shield and contacting the bottom surface of the shield.

19. A method for providing a magnetic read transducer having an air-bearing surface (ABS), the method comprising:

providing a first read shield;
providing a first read sensor;
providing a shield having a top surface and a bottom surface opposite to the top surface, the bottom surface facing the first read sensor;
providing a second read shield, the first read sensor, the second read sensor and the shield residing between the first read shield and the second read shield; and
providing a conductive via for providing electrical contact to the shield, the conductive via being insulated from the first read shield and the second read shield and contacting the bottom surface of the shield.

20. The method of claim 19 further comprising:
providing a third read sensor between the second read shield and the second read sensor;
providing a second shield having a second shield top surface and a second shield bottom surface opposite to the second shield top surface, the second shield bottom surface facing the second read sensor, the second shield residing between the third read sensor and the second read sensor; and
providing a second conductive via for providing electrical contact to the second shield, the second conductive via being insulated from the first read shield, the second read shield and the shield, the second conductive via contacting the second shield bottom surface.

21. The method of claim 20 further wherein the step of providing the conductive via further includes:
forming a via hole in the first read shield and all of at least one layer between shield and the first read shield; and
filling the via hole with a conductive material such that the conductive via is a monolithic structure.

22. The method of claim 20 wherein the step of providing conductive via further includes:
forming a via hole in the first read shield when the first read shield is exposed;
filling the via hole with a first conductive material when the first read shield is exposed;

forming at least one additional via hole aligned with the via hole in all of at least one layer between shield and the first read shield when the at least one layer is exposed; and filling the at least one additional via hole with at least one conductive material when the at least one layer is exposed such that the conductive via is a stacked via including a plurality of conductive layers.

23. The method of claim 20 wherein the step of providing conductive via further includes:

forming at least one via hole in all of at least one layer between shield and the first read shield when the at least one layer is exposed; and filling the at least one via hole with at least one conductive material when the at least one layer is exposed such that the conductive via is a stacked via including a plurality of conductive layers.

24. The method of claim 19 wherein the step of providing the shield further includes:

providing a first shield layer;

providing a second shield layer; and providing an insulating layer between the first shield layer and the second shield layer, the first shield layer residing between the first read sensor and the second shield layer, the first shield layer including the bottom surface, the second shield layer including the top surface, the conductive via contacting the first shield layer and being insulated from the second shield layer, the second shield layer having a second bottom surface facing the first shield layer and wherein the method further includes:

providing a second conductive via for providing electrical contact to the second shield layer, the second conductive via being insulated from the first read shield, the second read shield and the first shield layer, the second conductive via contacting the second bottom surface.

25. The method of claim 24 further wherein the step of providing the conductive via further includes:

forming a via hole in the first read shield and all of at least one layer between shield and the first read shield; and filling the via hole with a conductive material such that the conductive via is a monolithic structure.

26. The method of claim 24 wherein the step of providing conductive via further includes:

forming a via hole in the first read shield when the first read shield is exposed;

filling the via hole with a first conductive material when the first read shield is exposed;

forming at least one additional via hole aligned with the via hole in all of at least one layer between shield and the first read shield when the at least one layer is exposed; and filling the at least one additional via hole with at least one conductive material such that the conductive via is a stacked via including a plurality of conductive layers.

27. The method of claim 24 wherein the step of providing conductive via further includes:

forming at least one via hole aligned with the via hole in all of at least one layer between shield and the first read shield when the at least one layer is exposed; and filling the at least one via hole with at least one conductive material when the at least one layer is exposed such that the conductive via is a stacked via including a plurality of conductive layers.

* * * * *